(12) United States Patent
     Liu et al.

(10) Patent No.: US 11,113,684 B2
(45) Date of Patent: Sep. 7, 2021

(54) DEVICE, SYSTEM, AND METHOD FOR CREATING VIRTUAL CREDIT CARD

(71) Applicant: Tencent Technology (Shenzhen) Company Limited, Shenzhen (CN)

(72) Inventors: Guoguo Liu, Shenzhen (CN); Yi Wu, Shenzhen (CN); Chen Gong, Shenzhen (CN); Wenjing Zhang, Shenzhen (CN); Jinming Zhang, Shenzhen (CN); Jinwen Tan, Shenzhen (CN); Yixin Guo, Shenzhen (CN); Wa Ye, Shenzhen (CN); Liang Hou, Shenzhen (CN); Zhenyu Xu, Shenzhen (CN); Bin Zhang, Shenzhen (CN); Wei Chen, Shenzhen (CN); Haojian Zheng, Shenzhen (CN); Yingyi Jiang, Shenzhen (CN); Lingyun Song, Shenzhen (CN); Nan Jiang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 865 days.

(21) Appl. No.: 15/170,650

(22) Filed: Jun. 1, 2016

(65) Prior Publication Data
    US 2016/0275485 A1    Sep. 22, 2016

Related U.S. Application Data

(63) Continuation of application No. PCT/CN2015/070484, filed on Jan. 9, 2015.

(30) Foreign Application Priority Data

Mar. 13, 2014    (CN) .......................... 201410093651.X

(51) Int. Cl.
    *G06Q 20/34*    (2012.01)
    *G06Q 20/22*    (2012.01)
    (Continued)

(52) U.S. Cl.
    CPC .......... *G06Q 20/351* (2013.01); *G06Q 20/10* (2013.01); *G06Q 20/22* (2013.01); *G06Q 20/24* (2013.01);
    (Continued)

(58) Field of Classification Search
    CPC .... G06Q 20/363; G06Q 20/351; G06Q 20/10; G06Q 20/22; G06Q 20/24;
    (Continued)

(56) References Cited

U.S. PATENT DOCUMENTS 8,577,810 B1 * 11/2013 Dalit et al.
2007/0203850 A1 * 8/2007 Singh et al.
(Continued)

FOREIGN PATENT DOCUMENTS

| CN | 1619560 A | 5/2005 |
| CN | 101414370 A | 4/2009 |
| CN | 101414370 A | 4/2009 |

OTHER PUBLICATIONS

Office Action dated Nov. 28, 2017 for Chinese Application No. 20140093651.X, 13 pages.
(Continued)

*Primary Examiner* — James D Nigh
*Assistant Examiner* — Yin Y Choi
(74) *Attorney, Agent, or Firm* — Crowell & Moring LLP

(57) ABSTRACT

Device, system and method for creating virtual credit are provided. The method includes acquiring user real-name information from a user interface by a terminal device, wherein an electronic exchange account associating with the acquired user real-name information is not saved in a first
(Continued)

server; sending the user real-name information to a second server; detecting if a credit card account associating with the user real-name information is saved in the second server, and creating a virtual credit card account if the credit card account is saved in the second server; and storing the virtual credit card associated with the virtual credit card account in the data storage of the first server.

10 Claims, 16 Drawing Sheets

(51) Int. Cl.
*G06Q 20/10* (2012.01)
*G06Q 20/24* (2012.01)
*G06Q 40/02* (2012.01)
*G06Q 20/32* (2012.01)
*H04L 12/58* (2006.01)

(52) U.S. Cl.
CPC ....... *G06Q 20/3223* (2013.01); *G06Q 20/354* (2013.01); *G06Q 40/02* (2013.01); *H04L 51/046* (2013.01); *H04L 51/36* (2013.01)

(58) Field of Classification Search
CPC .. G06Q 20/3223; G06Q 20/354; G06Q 40/02; H04L 67/2842; H04L 51/046; H04L 51/36
USPC .......................................................... 705/71
See application file for complete search history.

(56) References Cited

U.S. PATENT DOCUMENTS

| | | |
|---|---|---|
| 2010/0145835 A1* | 6/2010 | Davis et al. |
| 2012/0271692 A1 | 10/2012 | Huang et al. |
| 2013/0054454 A1* | 2/2013 | Purves et al. |
| 2013/0103581 A1 | 4/2013 | Barry et al. |
| 2013/0144785 A1* | 6/2013 | Karpenko et al. |
| 2013/0159188 A1* | 6/2013 | Andon |
| 2015/0186872 A1* | 7/2015 | Sobol et al. |
| 2017/0012959 A1* | 1/2017 | Sierra et al. |

OTHER PUBLICATIONS

ISR and Written Opinion corresponding to PCT Application No. PCT/CN2015/070484, dated Feb. 26, 2015, (11p).

* cited by examiner

DEVICE, SYSTEM, AND METHOD FOR CREATING VIRTUAL CREDIT CARD

This application is a continuation out of PCT Application No. PCT/CN2015/070484, filed on Jan. 9, 2015, which claims priority to Chinese Patent Application No. 201410093651.X, filed on Mar. 13, 2014, both of which are hereby incorporated by reference in their entirety.

FIELD OF THE TECHNOLOGY

The present disclosure relates to the technology of data-processing, particularly to the data processing technology of a device, a system and a method for creating virtual credit card.

BACKGROUND OF THE TECHNOLOGY

The credit card may be created and managed by the corresponding management server. Credit card users may use the credit card to make purchases and transfer funds from between credit card account and the savings accounts. The credit card typically has a physical form and the credit card may associate with a bank.

SUMMARY OF THE TECHNOLOGY

A device, a system and a method for creating a virtual credit card are provided with examples of the present disclosure. The virtual credit card may not have a physical form of the credit card and the use and creation of the virtual credit card may not associate with the bank only. After the creation of the virtual credit card, the virtual credit card may be used and saved at a third party other than the bank.

The example for a device for creating a virtual credit card is provided. The device includes: a first server having the data storage containing real-user information, wherein the first server may be configured to: receive user real-name information from a user interface of a terminal device; determine whether an electronic exchange account associated with the acquired user real-name information is stored in the data storage; send, if the electronic exchange account is not stored in the data storage, the user real-name information to a second server, for use by the second server for detecting if a credit card account associating with the user real-name information is saved in the second server, receive a virtual credit card account created by the second server; and store the virtual credit card associated with the virtual credit card account in the data storage.

The example of the present disclosure provides a system for creating virtual credit card to be stored in a data storage. The system includes a first server having the data storage, a terminal device having a user interface communicating to the first server, and a second server communicating to the first server.

The terminal device of the system may be configured to: acquire user real-name information from a user interface by a terminal device, wherein an electronic exchange account associating with the acquired user real-name information is not save in the first server.

The first server of the system may be configured to: receive the user real-name information, and send the user real-name information to the second server. The second server may be configured to: receive the user real-name information, detect if a credit card account associating with the user real-name information is saved in the second server, and create a virtual credit card account if the credit card account is saved in the second server. And the first server is further configured to: store the virtual credit card associated with the virtual credit card account in the data storage of the first server.

The example for a method for creating a virtual credit card to be stored in a data storage includes steps of: acquiring user real-name information from a user interface by a terminal device, wherein an electronic exchange account associating with the acquired user real-name information is not saved in a first server; receiving the user real-name information by the first server, and sending the user real-name information to a second server; receiving the user real-name information by the second server, detecting if a credit card account associating with the user real-name information is saved in the second server, and creating a virtual credit card account if the credit card account is saved in the second server; and storing the virtual credit card associated with the virtual credit card account in the data storage of the first server.

BRIEF DESCRIPTION OF THE DRAWINGS

To describe the technical solutions in the examples of the present disclosure more clearly, the following briefly introduces the accompanying drawings needed for describing the examples or the prior art. Apparently, the accompanying drawings in the following description show some examples of the present disclosure, and persons of ordinary skill in the art can still derive other drawings from these accompanying drawings without creative efforts.

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
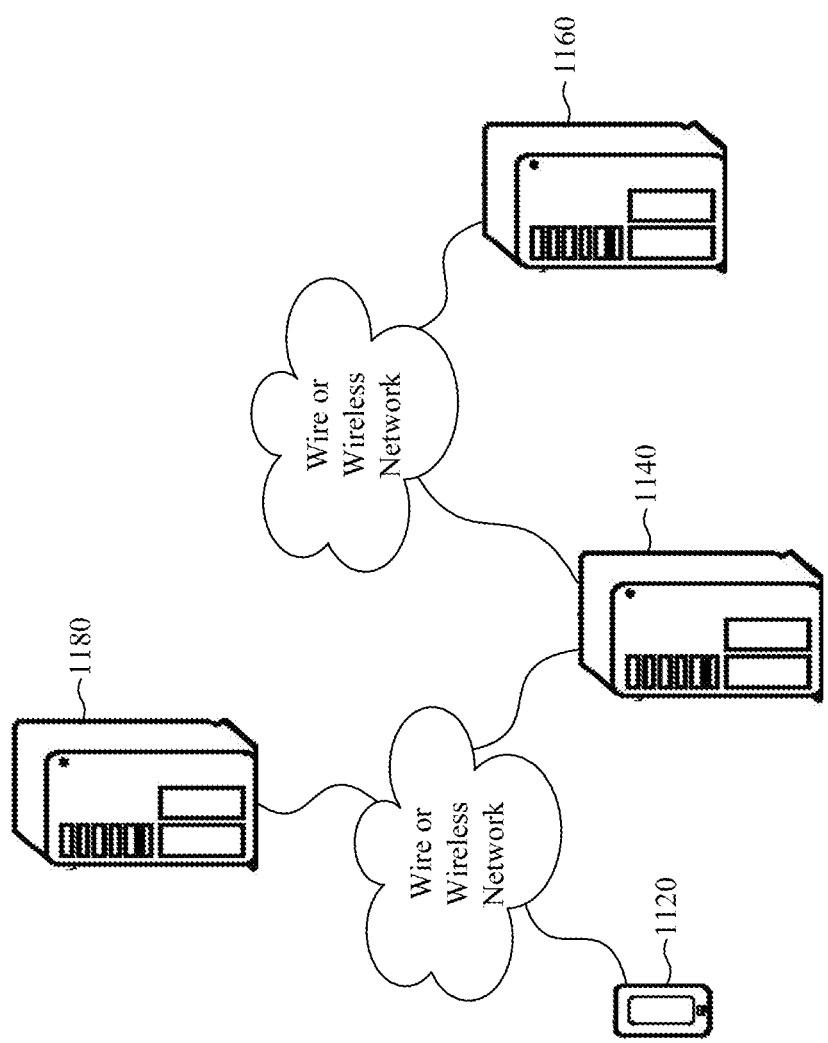
FIG. 1 is a structure schematic showing implementing environment for each example of the present disclosure.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Reference throughout this specification to "one example," "an example," "examples," "one embodiment," "an embodiment," "example embodiment," or the like in the singular or plural means that one or more particular features, structures, or characteristics described in connection with an embodiment or an example is included in at least one embodiment or one example of the present disclosure. Thus, the appearances of the phrases "in one embodiment," "in an embodiment," "in an example embodiment," "in one example," "in an example," or the like in the singular or plural in various places throughout this specification are not necessarily all referring to the same embodiment. Furthermore, the particular features, structures, or characteristics may be combined in any suitable manner in one or more embodiments or examples.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the terms "module," "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The exemplary environment may include a server, a terminal device, and a communication network. The server and the terminal device may be coupled through the communication network for information exchange, such as sending/receiving identification information, sending/receiving data files such as splash screen images, etc. Although only one terminal device and one server are shown in the environment, any number of terminals or servers may be included, and other devices may also be included.

The communication network may include any appropriate type of communication network for providing network connections to the server and terminal device or among multiple servers or terminal devices. For example, communication network may include the Internet or other types of computer networks or telecommunication networks, either wired or wireless. In a certain embodiment, the disclosed methods and apparatus may be implemented, for example, in a wireless network that includes at least one terminal device.

In some cases, the terminal device or the device may refer to any appropriate user terminal with certain computing capabilities, such as a personal computer (PC), a work station computer, a server computer, a hand-held computing device (tablet), a smart phone or mobile phone, or any other user-side computing device. In various embodiments, the terminal device may include a network access device. The terminal device may be stationary or mobile.

A server, as used herein, may refer to one or more server computers configured to provide certain server functionalities, such as database management and search engines. A server may also include one or more processors to execute computer programs in parallel.

It should be noticed that, the embodiments/examples and the features in the embodiments/examples may be combined with each other in a no conflict condition. This invention will become apparent from the following detailed description when taken in conjunction with the accompanying drawings.

It should be noticed that, the steps illustrated in the flowchart of the drawings may be performed in a set of computer device with executable program codes. And the order of the steps may be different from that in the drawings under some status, although a logic order is shown in the flowchart.

The purpose, technical proposal and advantages in the examples of the present disclosure will become more clear and complete from the following detailed description when taken in conjunction with the appended drawings. Apparently, the examples described thereinafter are merely a part of examples of the present disclosure, not all examples. Persons skilled in the art can obtain all other examples without creative works, based on these examples, which pertains to the protection scope of the present disclosure.

An existing method for creating credit card account includes: the account management server receives a request for creating credit card account of a user which is triggered in the page, according to the request for creating credit card account, an information input box is displayed to the user in the page, with the information input box used for entering the name, ID number, address, email and phone number, and other user information. Then, the account management server receives user information which is input into the corresponding input box, and provides the user information to staff for validation. When the user receives the feedback information from the staff indicating that the validation is passed; the account management server create a new credit card account based on the user information and generates the corresponding real credit card. Finally, the staff will mail the real credit card corresponding to the credit card account, so that user could use the credit card account by the credit card in the subsequent course.

During the implementation of the existing method, at least the following defects are found in the background art:

When applying for a credit card account in a web page, users need to enter more information, and user information need to be validated by staff, and such operations are more time consuming, which results in time-consuming to this operation, together with longer process and inefficiency for creating credit card account.

A device, a system and a method for creating a virtual credit card are provided with examples of the present disclosure. The virtual card creation may only require the input of a subset of user information. The virtual credit card may not have a physical form of the credit card and may be used the same way as the credit card with the same form. In addition, the virtual credit card may be created and saved at a reliable party other than a bank. In the following disclosure, the first server may refer to one or more processing servers that are operated by a third party other than a bank, the second server may be operated by a bank. The virtual credit card account may refer to the account that is created for the virtual credit card. The virtual credit card account and the virtual credit card may be used exchangeably under some circumstances. The terminal device refers to any user device that may have a user interface to allow a user to enter into information for applying for a credit card. The present disclosure provides method, device, system for creating virtual credit card, and the technical solution is described hereinafter:

In the first aspect, the present disclosure provides a device for creating credit card account, which is set in a first server, which includes:

A real-name receiving module, configured to receive user real-name information of a user who fails to open an electronic exchange account, with the user real-name information being sent by a terminal device; and A real-name forward module, configured to forward the user real-name information to a second server, with the user real-name information being configured to trigger the second server to detect if there is an existing credit account that corresponds to the user real-name information, and create a virtual credit card account for the user if the credit card account is detected out.

In the second aspect, the present disclosure provides a device for creating credit card account, which is set in a second server, which includes:

An information receiving module, configured to receive user real-name information of a user who fails to open an electronic exchange account from a first server, with the user real-name information being sent by a terminal device and sent to the first server;

An entity detection module, configured to detect if there is an existing credit account that corresponds to the user real-name information; and A virtual creation module, configured to create a virtual credit card account for the user if the credit card account is detected out.

In the third aspect, the present disclosure provides a device for creating credit card account, which is set in a terminal device, which includes:

A real-name acquiring module, configured to acquire user real-name information of a user who fails to open an electronic exchange account; and A real-name sending module, configured to send the user real-name information to the first server, with the user real-name information being configured to trigger the second server to detect if there is an existing credit account that corresponds to the user real-name information after the user real-name information being sent from the first server to the second server, and create a virtual credit card account for the user if the credit card account is detected out.

In the fourth aspect, the present disclosure provides a system for creating credit card account, which includes a terminal device, a first server communicating to the terminal device, and a second server communicating to the first server;

The terminal device comprises a device for creating credit card account according to the third aspect;

The first comprises a device for creating credit card account according to the first aspect;

The second server comprises a device for creating credit card account according to the second aspect.

In the fifth aspect, the present disclosure provides a method for creating credit card account, which includes:

Acquiring user real-name information of a user who fails to open an electronic exchange account, and then sending it to a first server by a terminal device;

Receiving the user real-name information by the first server, and then forwarding it to a second server; and Receiving the user real-name information by the second server, detecting if there is an existing credit account that corresponds to the user real-name information, and creating a virtual credit card account for the user if the credit card account is detected out.

In the sixth aspect, the present disclosure provides a method for creating credit card account, which includes:

Receiving user real-name information of a user who fails to open an electronic exchange account, with the user real-name information being sent by a terminal device; and Forwarding the user real-name information to a second server, with the user real-name information being configured to trigger the second server to detect if there is an existing credit account that corresponds to the user real-name information, and create a virtual credit card account for the user if the credit card account is detected out.

In the seventh aspect, the present disclosure provides a method for creating credit card account, which includes:

Receiving user real-name information of a user who fails to open an electronic exchange account forwarded by a first server, with the user real-name information being acquired by a terminal device and then sent to the first server; and Detecting if there is an existing credit account that corresponds to the user real-name information; and Creating a virtual credit card account for the user if the credit card account is detected out In the eighth aspect, the present disclosure provides a method for creating credit card account, which includes:

Acquiring user real-name information of a user who fails to open an electronic exchange account; and Sending the user real-name information to a first server, with the user real-name information being configured to trigger a second server to detect if there is an existing credit account that corresponds to the user real-name information after it being forwarded from the first server to the second server, and create a credit card account for the user if the credit card account is detected out.

In comparison with the prior art, the technical solution of the present disclosure acquires the user real-name information of the user who fails to open the electronic exchange account, and forwards it from the first server to the second server; after receiving the user real-name information, the second server detects if there is an existing credit account that corresponds to the user real-name information, and creates a virtual credit card account for the user if the credit card account is detected out. By this way, the present disclosure solves the problems that it's time-consuming and inefficient for creating credit card account.

Compared with the prior art, the method for creating credit card account of the present disclosure simplifies the process of acquiring a large quantity of user's information, and omits a manual verification for user's information, which simplifies the procedure for creating credit card account, thereby shortening the creation process and improving creation efficiency finally.

Other aspects, features, and advantages of this invention will become apparent from the following detailed description when taken in conjunction with the accompanying drawings.

Referring to FIG. 1, a structure schematic showing implementing environment for each example of the present disclosure is presented. The implementing environment includes a terminal 1120, a first server 1140 and a second server 1160.

The terminal 1120 may be electronic devices having digital processing ability, such as mobile phone, tablet PC, electronic reader, MP3 (Moving Picture Experts Group Audio Layer III) player, MP4 (Moving Picture Experts Group Audio Layer IV) player, laptop, and desktop PC, etc.

A terminal device may be the terminal 1120, which may be an electronic exchange terminal device with electronic exchange functions, such as Wechat (a chatting software) client, Taobao (an online shopping platform) client, Alipay (a payment platform) client, JD (an online shopping website) client, etc. Or, the terminal device also may be a social application terminal device with social functions, such as Wechat client, Laiwang client, or Line client, etc. Or, the terminal device further may be a terminal device with both of the electronic exchange functions and social functions, under this condition, electronic exchange account and social account are bound together or associated.

The terminal 1120 may be communicated with the first server 140 via wireless network or wired network.

The first server 1140 may be a server, a server group with multiple servers, or a cloud computing service center. This first server 1140 may be used for supplying electronic exchange operations by interacting with the terminal 1120, which may be built up by Internet service provider generally.

The first server 1140 may be communicated with the second server 1160 via wireless network or wired network.

The second server 1160 may be a server, a server group with multiple servers, or a cloud computing service center. This second server 1160 may be used for providing entity resource accounts, credit card accounts, and creation and administration of virtual credit card account that is provided in the examples. Commonly, the second server 1160 may be built up by a financial institution, such as a bank.

In addition, the implementing environment may further include a social server 1180, which is communicated with the terminal 1120 and the first server 1140 via wireless network or wired network. The social server 1180 may be a server, a server group with multiple servers, or a cloud computing service center. In a condition of the terminal device in the terminal 1120 has both of electronic exchange functions and social functions, the social server 1180 may be configured to provide social operation by interacting with the terminal 1120, such as instant messaging, voice communication, video communication, Twitter, blog, picture sharing or video sharing, etc. Furthermore, the social server 1180 in the present example may provide history social data of the user to the first server 1140, and the history social data may include at least one of history online time, history social members, and history chatting times for the user.

It should be noted that, terms mentioned in the examples of the present disclosure are explained as following.

User real-name information is used for verifying identity of the user who requests to create a virtual credit card account. The user real-name information includes user's name and certificate No. that refers to ID card No. commonly. In other conditions, the certificate No. may be the only number for identifying the user, such as passport No., officer No., etc. Additionally, the user real-name information may include mobile phone number of the user.

User history data is used for providing reference to the second server when it determines a credit limit for the virtual credit card account. The user history data may include at least one of history social data, history email data, history financing data, and history login data in the user history data. Concretely, the history social data means the related data in the social account that is associated with the user real-name information, which includes at least one of history online time, history social members, and history chatting times. The history email data means the related data in the email account that is associated with the user real-name information, which includes history email amount or history email size.

The history financing data means the related data in the financing account that is associated with the user real-name information, which includes history investment amount or history income amount. The history login data means related login data in social accounts, electronic exchange account, email accounts or other accounts that are associated with the user real-name information, which includes at least one of history login times, history login frequency, or history login duration.

In addition, the user history data may further include personal basic information of the user, such as age, birth date, birth place, education background, history school, family address, contact address and lineal consanguinity, and the like. Optionally, the user history data may include user's history exchange data in his electronic exchange account, which includes at least one of history exchange times, history exchange frequency, and history exchange amount.

Electronic exchange account is an account for implementing electronic exchange, it has functions of exchanging goal object and transferring resource such as fund, for example, the user transfers a part of resource from the resource pre-stored in the electronic exchange account to exchange a goal object, or the user transfers a part of resource in other accounts to the electronic exchange account. Different users may have different electronic exchange accounts. For example, the electronic exchange account may be Wechat payment account provided by Tencent technology Co., Ltd of China, Alipay account provided by Alibaba Group of China, JD account that is provided by Beijing JD 360 Electronic commerce Co., Ltd., or MeiTuan account provided by Beijing Science and Technology Co., Ltd., three fast online of China, and the like.

Social account is an account for implementing social functions. Different users may have different electronic exchange accounts. For example, the electronic exchange account may be Wechat account provided by Tencent technology Co., Ltd of China, Laiwang account provided by Alibaba Group of China, Line account provided by NHN of Korea, and the like.

Detailed description and explanation for creating credit card account provided by examples of the present disclosure follow.

Figure 2:
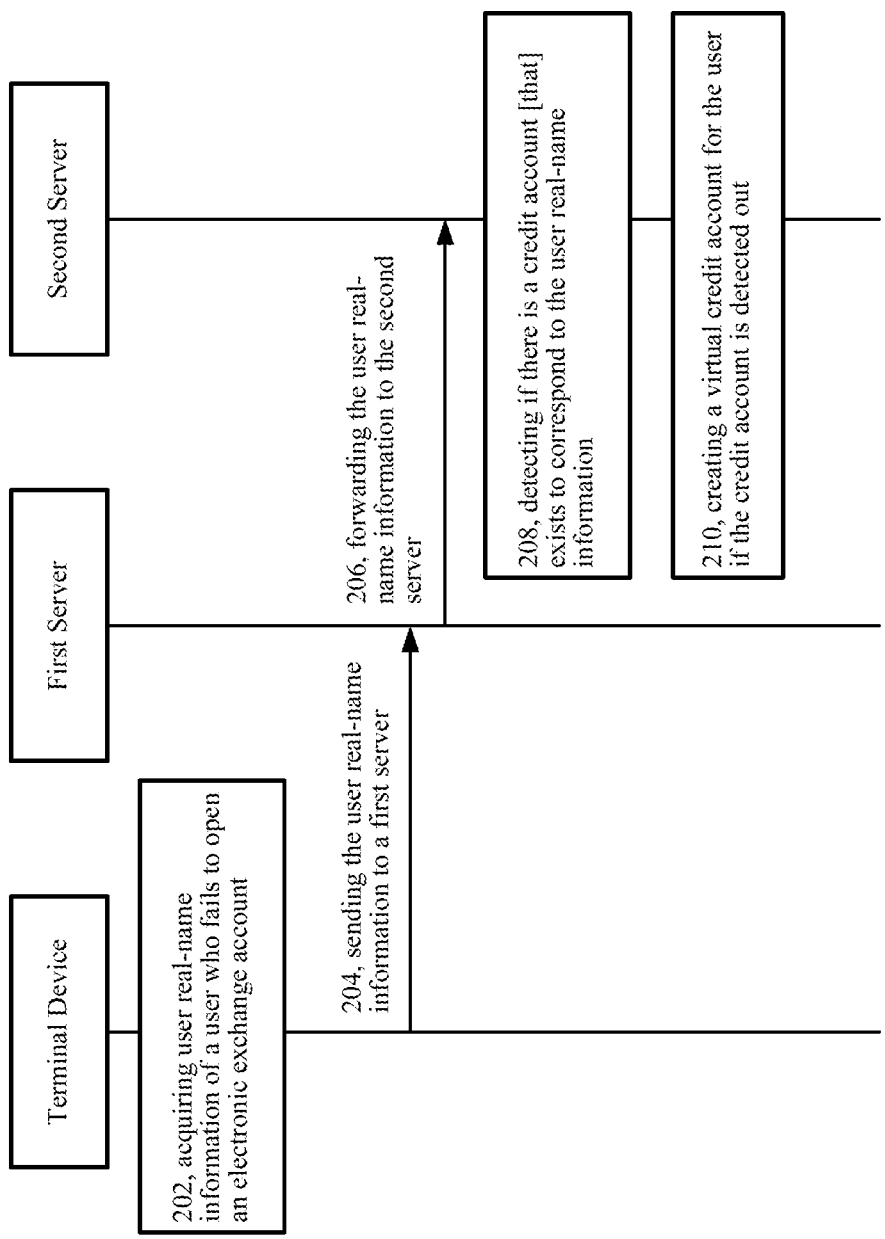
FIG. 2 is a method flow chart showing a method for creating credit card account according to an example of present disclosure.

Referring to FIG. 2, it shows a method flow chart of a method for creating the virtual credit card account according to an example of present disclosure. This method will be explained by applying to the implementing environment shown in FIG. 1, and the method includes the following steps.

Step 202, a terminal device acquires user real-name information of a user who fails to open an electronic exchange account;

Step 204, the terminal device sends the user real-name information to a first server.

Accordingly, the first server receives the user real-name information.

Step 206, the first server forwards the user real-name information to the second server.

Accordingly, the second server receives the user real-name information.

Step 208, the second server detects if there is an existing credit card account that corresponds to the user real-name information.

Step 210, the second server creates a virtual credit card account for the user if the credit card account is detected out.

Concretely, the steps 202 and 204 may implement the method of creating the virtual credit card account in the terminal device side; the step 206 may implement the method of creating credit card account in the first server side; and the steps 208 and 210 may implement the method of creating the virtual credit card account in the terminal device side.

In comparison with the prior art, the technical solution of the present disclosure acquires the user real-name information of the user who fails to open the electronic exchange account, and forwards it from the first server to the second server; after receiving the user real-name information, the second server detects if there is an existing credit account that corresponds to the user real-name information, and creates a virtual credit card account for the user if the credit card account is detected out.

By this way, the present disclosure solves the problems that it's time-consuming and inefficient for creating credit card account. Compared with the prior art, the method for creating credit card account of the present disclosure simplifies the process of acquiring a large quantity of user's information, and omits a manual verification for user's information, which simplifies the procedure for creating credit card account, thereby shortening the creation process and improving creation efficiency finally.

Figure 3A:
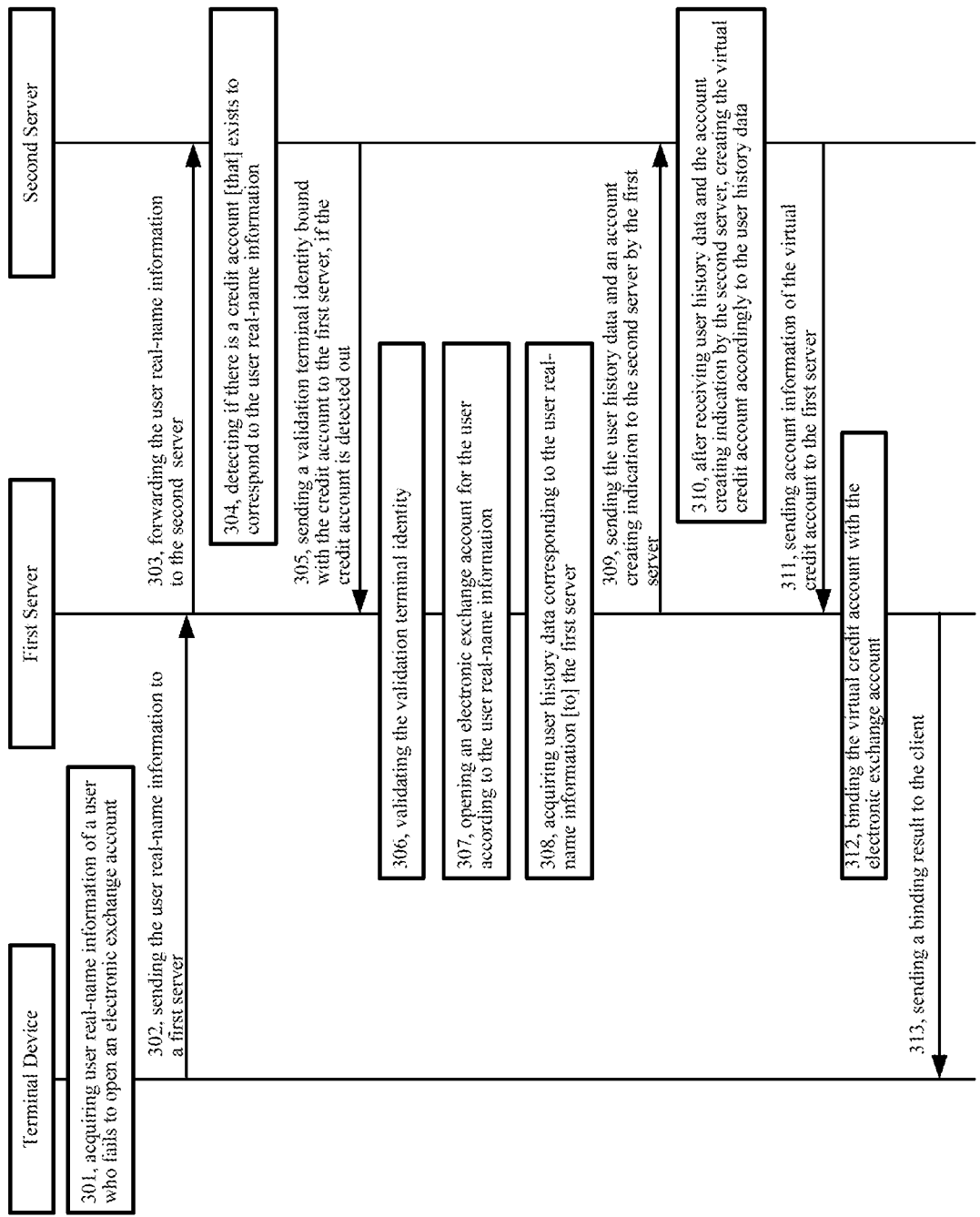
FIG. 3A is a method flow chart showing a method for creating credit card account according to another example of present disclosure.

Referring to FIG. 3A, it shows a method flow chart of a method for creating the virtual credit card account according to another example of present disclosure. This method will be explained by applying to the implementing environment shown in FIG. 1, and the method includes the following steps.

Step 301, a terminal device acquires user real-name information of a user who fails to open an electronic exchange account.

The terminal device may be an electronic exchange terminal device with electronic exchange functions, or a social application terminal device with social functions, or a terminal device with both of the electronic exchange functions and social functions. Currently, the user does not open an electronic exchange account for implementing electronic exchange function which is provided by the terminal device. In other words, the electronic exchange function is one of functions that are provided by the terminal device, which has not been used by the user. For example, the software running on the terminal device is downloaded just now and its electronic exchange function has not been used, that is an electronic exchange account has not been opened; or the user used other functions of the terminal device such as social function, file transfer function, or taking photo function before, but did not use the electronic exchange function. Concretely, the electronic exchange functions include payment, transfer or exchange, and the like.

In the condition without electronic exchange account opened, if the user requests to create a virtual credit card account, user real-name information will be requested to enter in the terminal device. The user real-name information includes user's name and certificate No. that refers to ID card No. commonly. In other conditions, the certificate No. may be the only number for identifying the user, such as passport No., officer No., etc.

Figure 3B:
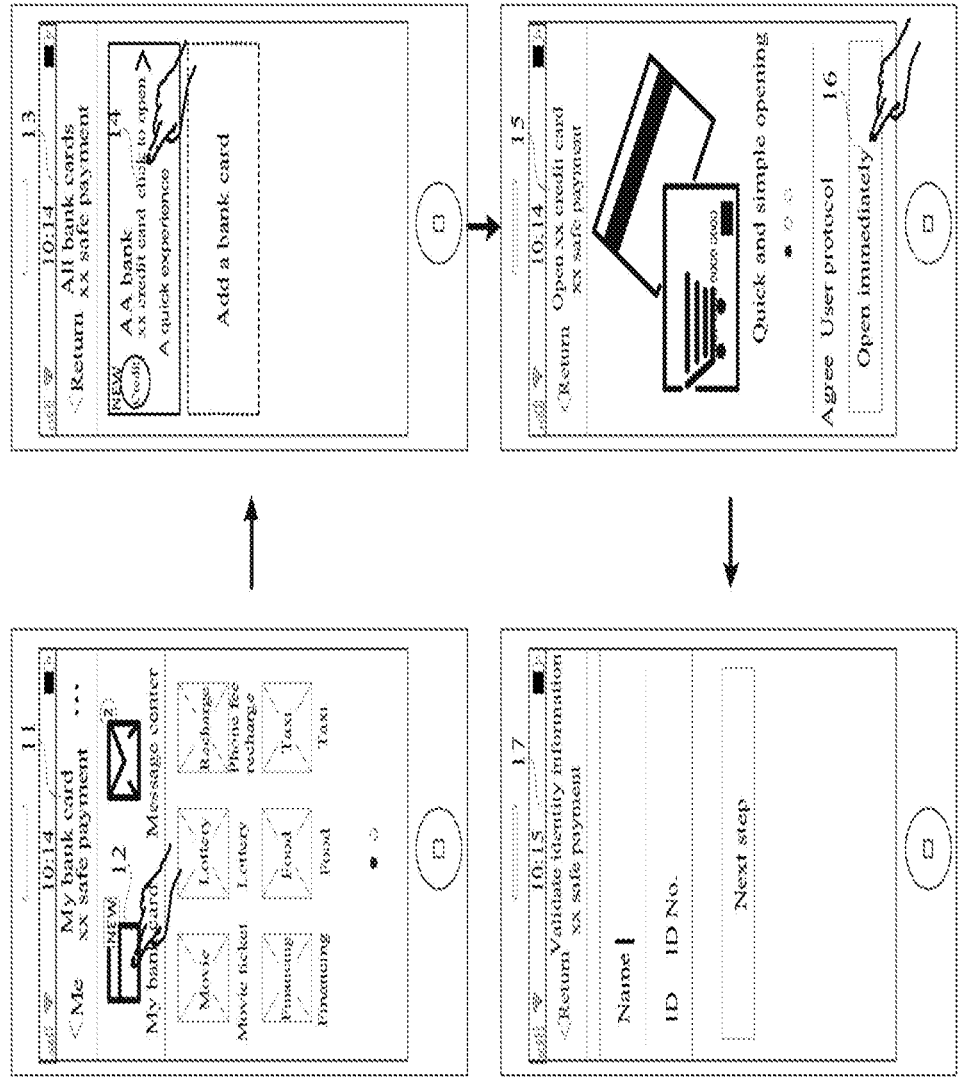
FIG. 3B is an interface schematic showing about acquiring user real-name information according to the example of present disclosure.

Combining with FIG. 3B which is an interface schematic showing about acquiring a subset of real-name information. If the user requested to create a virtual credit card account, firstly, he needs to click a button 12 of "my bank card" on an interface 11 of "my bank card", then the terminal device will turn to an interface 13 of "all bank cards"; after the user clicks a button 14 of "click to open" on the interface 13 of "all bank cards", the terminal device will turn to an interface 15 of "open XX credit card"; after the user clicks a button 16 of "open immediately" on the interface 15 of "open XX credit card", the terminal device will turn to an interface 17 of "validate identity information" that is an interface for acquiring the user real-name information. In the example, the real-name information entered by the user includes name and ID card No. After the user enters the name and the ID card No. in the corresponding position on the interface 17 of "validate identity information", the terminal device will acquire the user real-name information of the user.

Step 302, the terminal device sends the user real-name information to the first server.

After acquiring the user real-name information, the terminal device sends it to the first server. Concretely, the first server is a server corresponding to the terminal device, and the electronic exchange function is achieved by combining the first server and the terminal device.

Accordingly, the first server receives the user real-name information.

Step 303, the first server forwards the user real-name information to the second server.

Concretely, the second server may be configured to create the virtual credit card account for the user, thus it's necessary for the second server to collect and validate the user real-name information of the user who requests to create the virtual credit card account.

Accordingly, the second server receives the user real-name information.

Step 304, the second server detects if there is an existing credit account that corresponds to the user real-name information.

After receiving the user real-name information, the second server will detect if there is an existing credit account that corresponds to the user real-name information. Concretely, the credit card account may be a credit card account that is created according to the existing methods. An entity card so-called credit card will be got after the credit card account is created. In addition, the current virtual credit card account to be created is a new account that does not correspond to the credit card account mentioned above, that is to say, the virtual credit card account and the credit card account mentioned above are different.

The second server stores relationships between user real-name information of different users who have created a credit card account, and different credit card accounts. Concretely, the second server may detect if the user has created a credit card account in the past by performing the step 304.

Step 305, the second server sends a validation terminal identity bound with the credit card account to the first server, if the credit card account is detected out.

Each credit card account is bound with at least one validation terminal identity which may be the mobile phone number which is reserved by the user when applying for the credit card account. The validation terminal identity may be email address, or telephone number in other conditions.

If the credit card account is detected out, the second server will firstly acquire the validation terminal identity that is bound with the credit card account, and then send it to the first server, so that the first server carries out the validation to the validation terminal identity in the succeeding step 306, thereby verifying the identity of the user to confirm the current user who creates the virtual credit card account is that the user who actually has the credit card account.

Accordingly, the first server receives the validation terminal identity bound with the credit card account.

In addition, if no credit card account is detected out, the second server will send an indicator that indicates no existing credit card account to the first server.

This indicator is used for triggering the first server to send an indication of stopping creation of the virtual credit card account.

Optionally, the indicator is used for triggering the first server to send a binding instruction to the terminal device. Accordingly, the terminal device receives this binding instruction to obtain account information of user's resource saving account, and then sends it to the first server. So that, the first server opens an electronic exchange account according to the user real-name information, and then binds the resource saving account with the electronic exchange account, and sends the binding result to the second server. As a result, the second server creates a virtual credit card account for the user, after receiving the binding result.

Step 306, the first server validates the validation terminal identity.

Concretely, this step may include the following sub-steps.

First, sending validation information to a validation terminal indicated by the validation terminal identity.

If the mobile phone number is served as the validation terminal identity, the first server may send validation information to the corresponding mobile phone according to the mobile phone number. Generally, the validation terminal identity includes server numbers and/or letters.

Figure 3C:
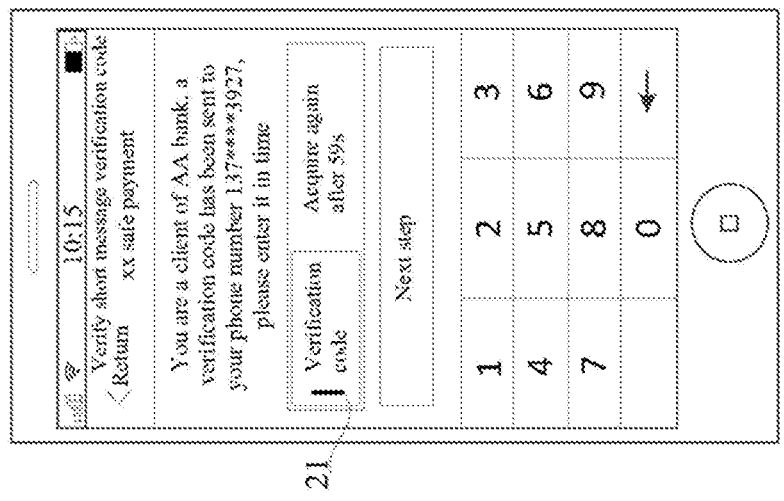
FIG. 3C is an interface schematic showing a method for creating credit card account according to the example of present disclosure.

Meanwhile, the first server will trigger the terminal device to display a validation interface. Referring to FIG. 3C which shows a typical validation interface, information to be validated will be entered in the input box 21, which is guided by indicators displayed in the validation terminal.

Second, receiving the information to be validated sent by the terminal device.

If the user has owned a credit card account, and the mobile phone number saved when applying for the credit card account is the mobile phone number he is using now, the validation information from the first server may be checked.

After that, the user enters the validation information to the validation interface shown on the terminal device, which is served as the information to be validated that will be sent to the first server to validate. Accordingly, the first server will receive the information to be validated sent by the terminal device.

Third, detecting if the information to be validated is the same with the validation information.

Concretely, the first server will compare the validation information that is sent before with the information to be validated that is received, and then detect the both.

Four, if the both are the same, the validation for the validation terminal identity is passed, and an indicator is saved in the first server.

Concretely, if the both are the same, that means the virtual credit card account that is applied for is the account that the user has owned, that is to say, the validation for the validation terminal identity is passed.

If the both are different, the validation for the validation terminal identity is failed. As a result, the first server may perform the validation again, or send an indication of stopping creating the virtual credit card account to the terminal device.

After the validation for the terminal information of the user (that is the validation terminal identity in this example) is passed, the first server triggers the second server to create a virtual credit card account for the user. Specifically, the passed validation shows that the user has owned at least one credit card account, so that the first server will identify that the user is very likely qualified for creating a virtual credit card account, because of that his applying for creating a credit card account has been allowed.

In this example merely takes an example of validating the terminal information by using mobile phone short message validation, however other ways such as one of instant messaging validation, voice validation, and email validation, or any combination thereof also may be used, which are not limited here.

In the present example, before trigger the second server to create the virtual credit card account, the method further includes the following steps.

Step 307, the first server opens an electronic exchange account for the user according to the user real-name information.

Concretely, the first server will open an electronic exchange account according to the user real-name information, so that the user may carry out electronic exchanges after acquiring the virtual credit card account.

Specifically, the step 307 includes the following sub-steps.

First, sending an exchange key acquiring instruction to the terminal device by the first server.

Concretely, the exchange key acquiring instruction may be configured to trigger the terminal device to display an exchange key acquiring interface.

Accordingly, the terminal device will receive this instruction.

Second, acquiring an electronic exchange key according to the exchange key acquiring instruction by the terminal device.

Concretely, after receiving the exchange key acquiring instruction, the terminal device will display the exchange key acquiring interface, and then acquire the electronic exchange key entered in the interface.

Figure 3D:
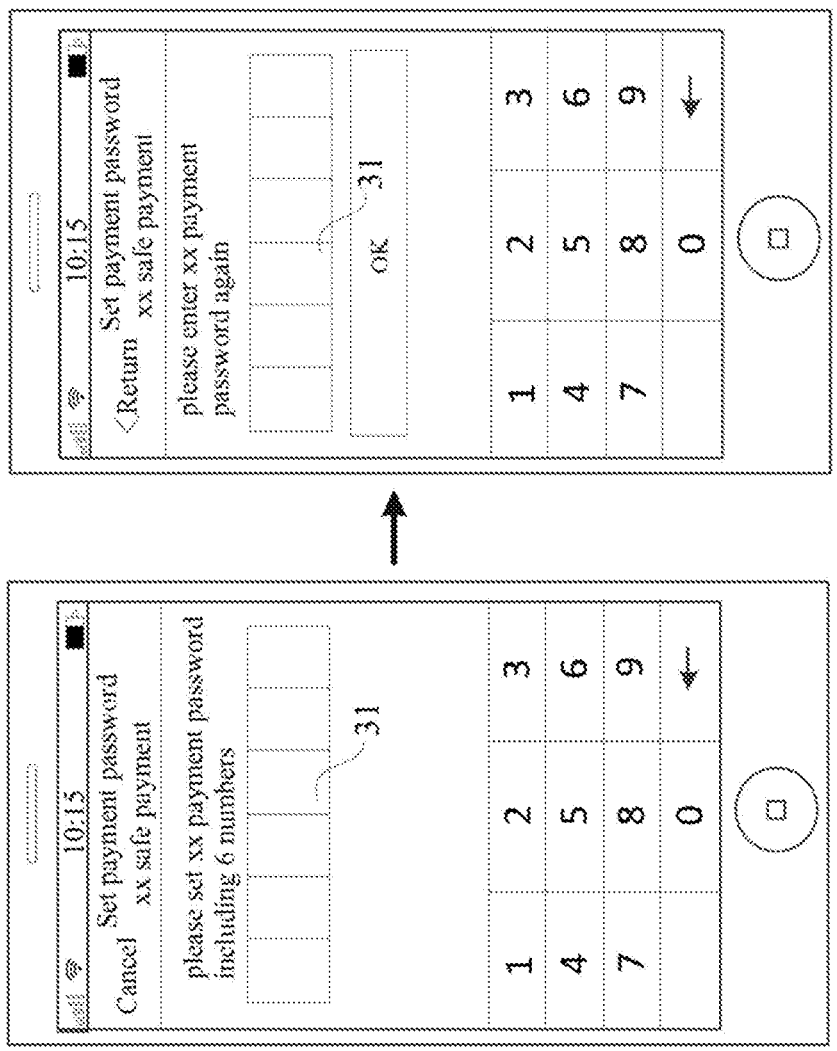
FIG. 3D is an interface schematic showing a typical exchange key acquiring interface according to the example of present disclosure.

FIG. 3D shows a schematic view of a typical exchange key acquiring interface, by which an exchange key is guided to be entered in an input box 31. Usually, the exchange key includes server numbers and/or letters.

Third, sending the exchange key to the first server by the terminal device.

Accordingly, the first server receives it.

Four, opening the electronic exchange account according to the exchange key and the real-name user information by the first server.

Concretely, the first server will set the exchange key to be the password of the electronic exchange account for the user, namely, this exchange key is requested to enter when the user performs electronic exchanges by the electronic exchange account. In such a way, security of electronic exchange process is enhanced, which ensures property safety for the user.

The electronic exchange account may be a real-name authentication account, that is, the electronic exchange account is bound with the user real-name information. A validation by using user real-name information may be carried out if user's account has security problem or key change problem, which ensures security of the electronic exchange account.

Step 308, the first server acquires user history data corresponding to the user real-name information.

Concretely, when the terminal device has both of electronic exchange function and social function, the user history data may include history social data which is corresponding to a social account associated with the user real-name information, namely the current login social account. Concretely, the history social data may include at least one of history online time, history social members, and history chatting times. The first server may obtain the history social data from the social server, as shown the implementing environment of FIG. 1.

In addition, the user history data may include at least one of history social data, history email data, history financing data, and history login data in the user history data. The history email data means the related data in the email account that is associated with the user real-name information, which includes history email amount or history email size. The history financing data means the related data in the financing account that is associated with the user real-name information, which includes history investment amount or history income amount.

The history login data means related login data in social accounts, electronic exchange account, email accounts or other accounts that are associated with the user real-name information, which includes at least one of history login times, history login frequency, or history login duration.

Usually, the user history data may further include personal basic information of the user, such as age, birth date, birth place, education background, history school, family address, contact address and lineal consanguinity, and the like. Optionally, the user history data may include user's history exchange data in his electronic exchange account, which includes at least one of history exchange times, history exchange frequency, and history exchange amount.

Concretely, the electronic exchange account may be the account associated with the social account, for example, the electronic exchange account is Tenpay (an online payment service provider in China) account, while the social account is Wechat (a social platform in China) account or Tencent QQ (a social platform in China) account, or the electronic exchange account may be other accounts associated with the user real-name information, such as online banking account.

User history data is used for providing reference to the second server when it determines a credit limit for the virtual credit card account, which will be described and explained in detailed in step 310.

Step 309, the first server sends the user history data and an account creation indicator to the second server.

Concretely, the first server sends the user history data and an account creation indicator to the second server, concretely the user history data is used for providing reference to the second server when it determines an credit limit for the virtual credit card account, while the account creation indicator is used for triggering the second server to create the virtual credit card account.

Accordingly, the second server receives them.

It should be noted that, the step 308 may be performed before or after the steps 206 and 307, or synchronously. The above example merely takes one example, which is not limited here. Additionally, the user history data and the account creation indicator may be sent to the second server by carried in the same signaling, or sent in order, this example is merely one of examples.

Step 310, after receiving the user history data and the account creation indicator, the second server creates the virtual credit card account accordingly to the user history data.

Concretely, this step 310 may include several sub-steps.

First, accessing history social data, and/or history email data, and/or history financing data, and/or history login data in the user history data by the second server.

The personal basic information and/or history exchange data included in the user history data also may be accessed.

Second, determining a credit limit of the virtual credit card account according to the history social data, and/or history email data, and/or history financing data, and/or history login data in the user history data.

Concretely, the credit limit is used for identifying the max spending amount for the virtual credit card account. For preventing an over spending, this credit limit for the virtual credit card account is necessary. Any transferring resource, such as payment by the virtual credit card could not exceed the credit limit during article exchanging, purchases, and this transferring resource may be used for exchanging physical goods and/or virtual goods.

The second server determines the credit limit of the virtual credit card account according to the history social data, and/or history email data, and/or history financing data, and/or history login data in the user history data. For example, the credit limit is big if the history login time on the terminal device with social function is large, or if the history login duration is long. That is because the history social data may reflect everyday life activities of the user, which is considered as a reference for his credit.

Third, creating the virtual credit card account according to the credit limit by the second server.

Concretely, after the credit limit is determined, the second server will create a virtual credit card account and associate it with the credit limit.

Hereto, verification process and creation for creating virtual credit card account has been completed. Concretely, compared with the prior art needed a large quantity of information including user's name, ID card No., address, email address and phone number, only a few user real-name information such as ID card No. and name is requested in this verification process, thus privacy of the user is protected, and information security is ensured. Furthermore, the second server determines the credit limit according to the user history data, which is simple and efficient.

Figure 3E:
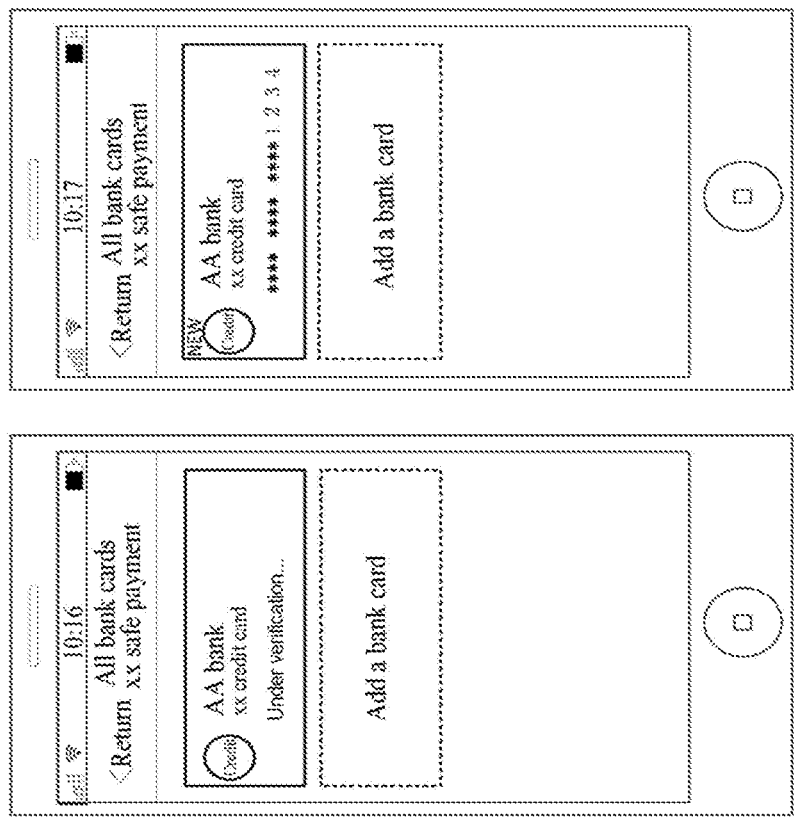
FIG. 3E is interface schematics showing the virtual credit card account during and after verification according to the example of present disclosure.

FIG. 3E is interface schematics showing the virtual credit card account during and after verification according to the example of present disclosure, with the left side shows the undergoing of the verification process, and the right side shows the completion of the verification process.

Step 311, the second server sends account information of the virtual credit card account to the first server.

The account information includes account number, credit limit, expiry date, accounting date, etc.

Accordingly, the first server receives the account information sent by the second server and saves a virtual credit card according to the account information.

Step 312, the first server binds the virtual credit card account with the electronic exchange account.

Concretely, after the first server binds them together, the user may choose goods to be exchanged or purchased and pay it by the virtual credit card account, after login the electronic exchange account.

Step 313, the first server sends a binding result to the terminal device.

The binding result may carry information of the virtual credit card account such as account number and credit limit.

Accordingly, the terminal device receives the binding result sent by the first server.

Figure 3F:
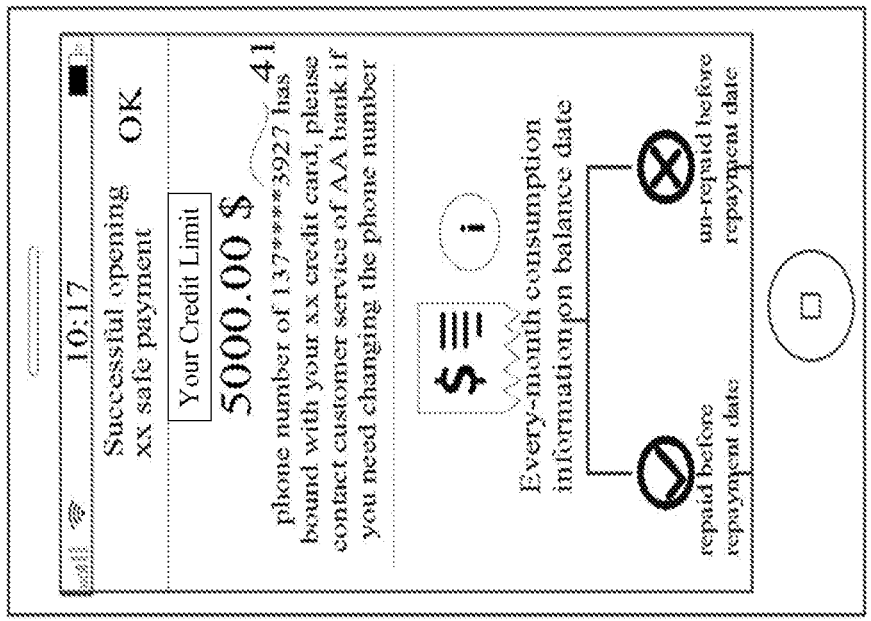
FIG. 3F is an interface schematic showing about credit limit according to the example of present disclosure.

FIG. 3F is an interface schematic showing the binding result. As shown, the credit limit 41 may be displayed on the terminal device to inform the user, after the binding result is received.

It should be noted that, since the user did not open electronic exchange account before applying for the virtual credit card account, thus for a terminal device which has both of electronic exchange function and social function, the user may login his social account firstly, and then the first server opens an electronic exchange account that is associated with the social account for him. So that, related information of the social account such as account number, nickname, portrait may be used in the electronic exchange account. For a terminal device with electronic exchange function only, during the opening process of the electronic exchange account, the first server may collect information including nickname, or portrait besides the user real-name information and electronic exchange key.

In conclusion, the technical solution of the present disclosure acquires the user real-name information of the user who fails to open the electronic exchange account, and forwards it from the first server to the second server; after receiving the user real-name information, the second server detects if there is an existing credit account that corresponds to the user real-name information, and creates a virtual credit card account for the user if the credit card account is detected out.

By this way, the present disclosure solves the problems that it's time-consuming and inefficient for creating credit card account. Compared with the prior art, the method for creating credit card account of the present disclosure simplifies the process of acquiring a large quantity of user's information, and omits a manual verification for user's information, which simplifies the procedure for creating credit card account, thereby shortening the creation process and improving creation efficiency finally.

In addition, the first server in the present example acquires the user history data corresponding to the user real-name information, and then sends it to the second server, so that, the user history data is considered as a reference for determining the credit limit of the virtual credit card account in the second server. In such a way, the accuracy for setting the credit limit is ensured; meanwhile the creation of the virtual credit card account is quick and efficient.

Furthermore, the first server in the examples opens electronic exchange account for the user which is bound with the virtual credit card account; as a result, electronic transactions may be conducted by the two accounts after the user gets the virtual credit card account, which improves the convenience of usage of the virtual credit card account.

Furthermore, the method for creating virtual credit card account provided by the present disclosure collects the history information in the social application accounts and/or electronic exchange application accounts that are owned by the user, which is considered as a reference and basis for verifying the user, thus complex procedure such as submitting user information or manually collecting user information is omitted, thereby improving efficiency of creating virtual credit card account.

Figure 4:
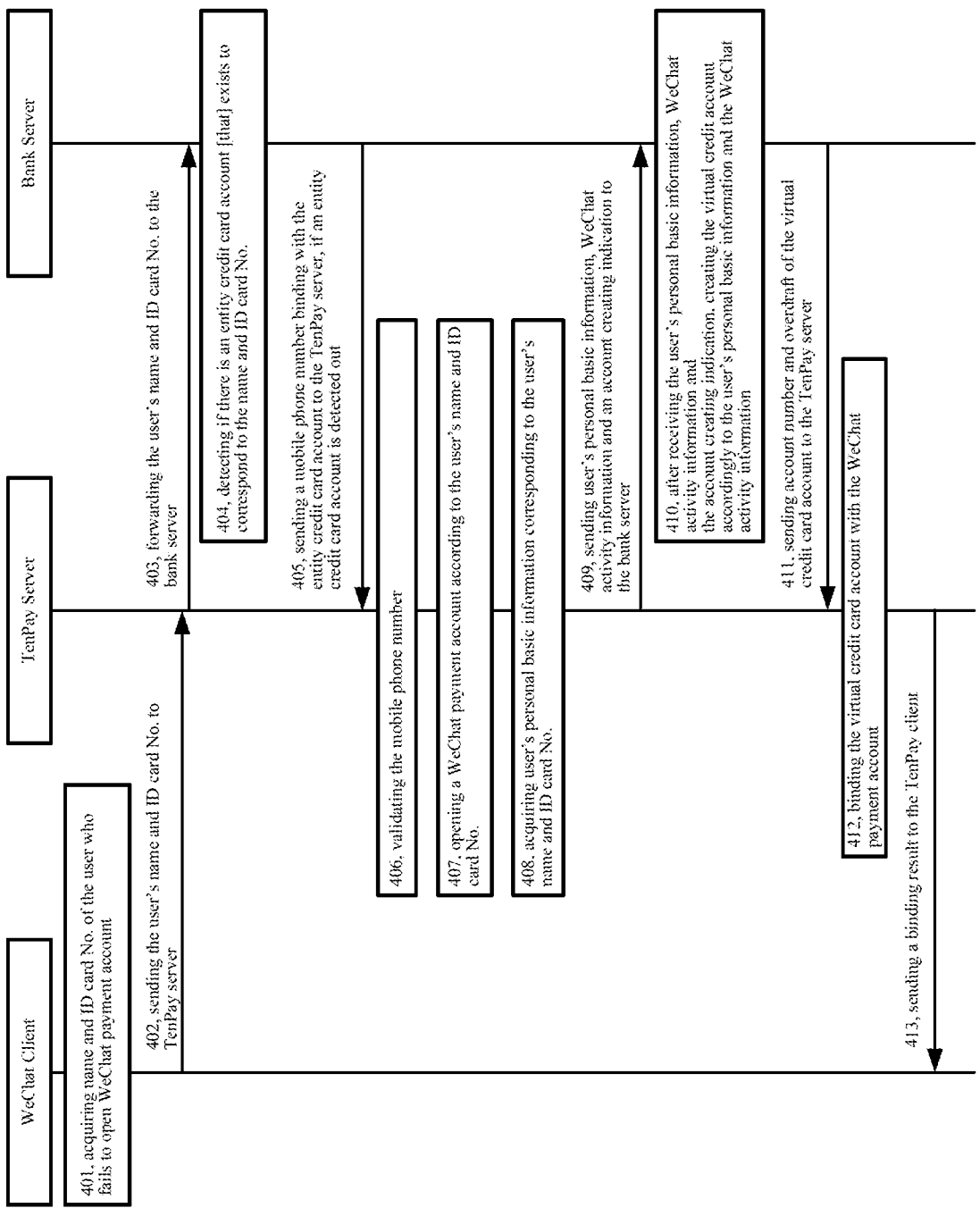
FIG. 4 is a flowchart of a method for creating credit card account according to a specific example of present disclosure.

FIG. 4 is a flow chart of a method for creating credit card account according to a specific example. The implementing body includes a terminal device, a first server, and a second server. The terminal device and the second server are communicated with the first server respectively via wired network or wireless network. The terminal device may be a terminal device with electronic exchange function, or a terminal device with both of electronic exchange function and social function, such as Alipay (a payment platform) client, Wechat (chatting software) client. The first server is corresponding to the terminal device that serves as Alipay client and/or Wechat client, and the electronic exchange function is achieved by the combination of the both, such as online shopping, or online payment. The second server is for creating virtual credit card account such as a virtual credit card account for the user.

In the following example, Wechat client is considered as the terminal device, Tenpay server is considered as the first server, bank server is considered as the second server, Wechat payment account is considered as electronic exchange account, user's name and ID card No. are considered as user real-name information, mobile phone number is considered as validating terminal identity, mobile phone is considered as verification terminal, Wechat payment password is considered as exchange key, user's personal basic information and Wechat activity information are considered as user history data, the existing credit card account is considered as credit card account, and virtual credit card account is considered as virtual credit card account. Creation of virtual credit card account may be realized by interaction among the Wechat client, Tenpay server, and bank server. Following is the description and explanation for the creation process.

Step 401, the Wechat client acquires name and ID card No. of the user who fails to open Wechat payment account.

Step 402, the Wechat client sends the user's name and ID card No. to the Tenpay server.

Accordingly, the Tenpay server receives them.

Step 403, the Tenpay server forwards the user's name and ID card No. to the bank server.

Accordingly, the bank server receives them.

Step 404, the bank server detects if there is an entity credit card account exists to correspond to the name and ID card No.

Step 405, the bank server sends a mobile phone number that is bound with the entity credit card account to the Tenpay server, if an entity credit card account is detected out.

Accordingly, the Thepay server receives the mobile phone number.

If no entity credit card account is detected out, then the bank server send an indictor showing no existing credit card account to the Tenpay server.

This indicator is used for triggering the Tenpay server to send an indication of stopping creation of the virtual credit card account to the Wechat client.

Optionally, the indicator is used for triggering the Tenpay server to send a binding instruction to the Wechat client. Accordingly, the Wechat client receives this binding instruction to obtain card number of user's debit card account, and then sends it to the Tenpay server. So that, the Tenpay server opens a Wechat payment account according to the user's name and ID card. No., and then binds the Wechat payment account with the debit card account, and sends the binding result to the bank server. As a result, the bank server creates a virtual credit card account for the user, after receiving the binding result.

Step 406, the Tenpay server validates the mobile phone number.

Concretely, this step may include the following sub-steps.

First, sending validation information to the mobile phone indicated by the mobile phone number.

Second, receiving the information to be validated sent by the Wechat client.

Third, detecting if the information to be validated is the same with the validation information.

Four, if the both are the same, the validation for the mobile phone number is passed.

Additionally, if the both are different, the validation for the mobile phone number is failed. As a result, the first server may perform the validation again, or send an indication of stopping creating the virtual credit card account to the Wechat client.

Step 407, the Tenpay server opens a Wechat payment account according to the user's name and ID card No.

Specifically, the step 407 includes the following substeps.

First, the Tenpay server sends a payment password acquiring instruction to the Wechat client.

Concretely, the Wechat client receives the payment password acquiring instruction.

Second, the Wechat client acquires a Wechat payment password entered by the user according to the payment password acquiring instruction.

Third, the Wechat client sends the Wechat payment password to the Tenpay server.

Accordingly, the Tenpay server receives it.

Four, the Tenpay server opens the Wechat payment account according to the Wechat payment password and user's name and ID card No.

Step 408, the Tenpay server acquires user's personal basic information and Wechat activity information corresponding to the user's name and ID card No.

Step 409, the Tenpay server sends the user's personal basic information, Wechat activity information and an account creation indicator to the bank server.

Accordingly, the bank server receives them.

Step 410, after receiving the user's personal basic information, Wechat activity information and the account creation indicator, the bank server creates the virtual credit card account accordingly to user's personal basic information and the Wechat activity information.

Concretely, this step 410 may include several substeps.

First, accessing user's personal basic information and Wechat activity information.

Second, determining a credit limit of the virtual credit card account according to user's personal basic information and Wechat activity information.

Third, creating the virtual credit card account according to the credit limit.

Step 411, the bank server sends account number and credit limit of the virtual credit card account to the Tenpay server.

Accordingly, the Tenpay server receives them.

Step 412, binding the virtual credit card account with the Wechat payment account.

Step 413, sending a binding result to the Tenpay terminal device.

Accordingly, the Tenpay terminal device receives the binding result sent by the Wechat client.

It should be noted that, after the virtual credit card account is created successfully, the user may use it for online shopping or online payment in Wechat platform, and these consumption business pertains to credit limit-consumption. Any credit limit in the virtual credit card account is advanced paid by the bank, and the user is requested to repay it within a stated date, this operation is similar to that of the existing credit card account, which is not provided here.

The present disclosure provides a method for creating a virtual credit card to be stored in a data storage. The method may include:

Acquiring user real-name information from a user interface by a terminal device, wherein an electronic exchange account associating with the acquired user real-name information is not saved in a first server;

Receiving the user real-name information by the first server, and sending the user real-name information to a second server;

Receiving the user real-name information by the second server, detecting if a credit account associating with the user real-name information is saved in the second server, and creating a virtual credit card account if the credit account is saved in the second server; and Storing the virtual credit card associated with the virtual credit card account in the data storage of the first server.

The virtual credit card may be stored in the first server after the second server creates the virtual card account. The virtual credit card may be tied with the electronic account and/or the exchange resource account. The first server may provide the cardholder means to access the card, such as an additional user interface to access the card via a terminal device. The terminal device may be cardholder's own mobile phone, mobile terminal or another other devices. The access to the virtual credit card may be provided to the cardholder after the verification of the cardholder is passed. Any verification means, either currently known or later developed, may be used for such verification purpose. By this way, the user does not need to have a physical credit card.

In case the virtual credit card tied with the electronic exchange account, the historical data stored or obtained by the first server may be used to verify the cardholder for the virtual credit card. In addition, the cardholder's own phone may provide built-in methods for the verification, such as fingerprint verification.

As such, the first server may determine whether the access to the virtual credit card is authorized, by using at least one of following methods: 1, newly developed verification process such as asking the cardholder to input the passcode in a user interface; 2, existing verification from electronic exchange account and/or electronic resource account (history data may be used); or 3, the third party built-in verification, for example, built-in mobile phone access verification.

After the verification is passed, an indicator may be saved in the first server and the cardholder may use the virtual credit card to make payments.

Before creating the virtual credit card account, the method may further include: acquiring user history data stored in the data storage of the first server according to the user real-name information, and sending the user history data to the second server; and receiving the user history data by the second server, and creating the virtual credit card account by using the user history data.

When creating the virtual credit account by using the user history data, the method may include: analyzing the user history data by accessing at least one of: user payment data, user social data, historical email data, historical financing data and historical login data that are included in the user history data received by the second server; and determining, by the second server, a credit limit of the virtual credit card account according to the analyzed user history data.

Before creating the virtual credit account, the method may further include: validating the terminal device by the first server, wherein validating the terminal device may include: sending, by the second server, a validation terminal identity bound with the credit account to the first server; receiving, by the first server from the second server, the validation terminal identity; sending validation information to a second user interface according to the validation terminal identity received by the first server; in response to sending the validation information, receiving second validation information from the terminal device; determining whether the second validation information matches the validation information; and validating the terminal device by saving an indicator in the data storage of the first server to indicate the terminal device is validated if the second validation information matches the validation information.

When validating the terminal device by the first server, the method may further include: validating the terminal device by using at least one of: SMS validation, instant messaging validation, voice validation, and email validation.

After receiving the user real-name information by the first server, the method may further include: creating the electronic exchange account according to the received user real-name information by the first server, and saving the electronic exchange account to the data storage of the first server.

After creating the virtual credit card account, the method may further include: sending, by the second server, account information of the virtual credit card account to the first server; receiving the account information by the first server; binding the virtual credit card account with the electronic exchange account; and displaying a binding result in the user interface of the terminal device.

When creating the electronic exchange account according to the user real-name information by the first server, the method may include: sending an exchange key acquiring instruction to the user interface of the terminal device; according to the exchange key acquiring instruction, acquiring an electronic exchange key, and sending the electronic exchange key to the first server; and receiving the electronic exchange key by the first server, and creating the electronic exchange account according to the electronic exchange key and the real-name user account.

Following descriptions aim at examples of device which performs the examples of method mentioned above. Any undisclosed details may be reviewed in the examples of method mentioned above.

Figure 5:
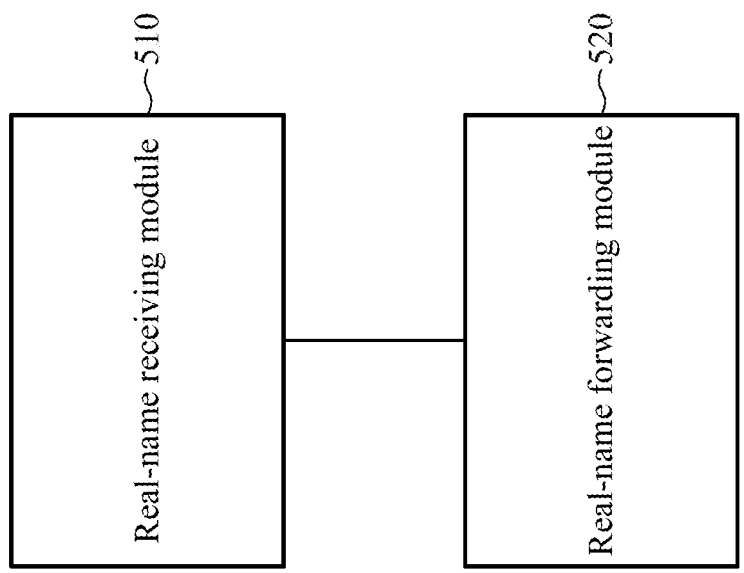
FIG. 5 is a frame diagram showing a device for creating credit card account according to an example of present disclosure.

Referring to FIG. 5 that is a frame diagram showing a device for creating credit card account according to an example of present disclosure, the device for creating credit card account may become a part of or a whole of the first server by using of software, hardware or their combination. The device includes a real-name receiving module 510 and real-name forwarding module 520.

Concretely, real-name receiving module 510 may be configured to receive user real-name information of a user who fails to open an electronic exchange account, with the user real-name information being sent by a terminal device.

The real-name forward module 520 may be configured to forward the user real-name information to a second server, with the user real-name information being configured to trigger the second server to detect if there is an existing credit account that corresponds to the user real-name information, and create a virtual credit card account for the user if the credit card account is detected out.

In conclusion, in the technical solution of the present disclosure, the first server receives the user real-name information of the user who fails to open the electronic exchange account sent by the terminal device, and the forwards it to the second server, with the user real-name information being configured to trigger the second server to detect if there is an existing credit account that corresponds to the user real-name information, and create a virtual credit card account for the user if the credit card account is detected out.

By this way, the present disclosure solves the problems that it's time-consuming and inefficient for creating credit card account. Compared with the prior art, the method for creating credit card account of the present disclosure simplifies the process of acquiring a large quantity of user's information, and omits a manual verification for user's information, which simplifies the procedure for creating credit card account, thereby shortening the creation process and improving creation efficiency finally.

Figure 6:
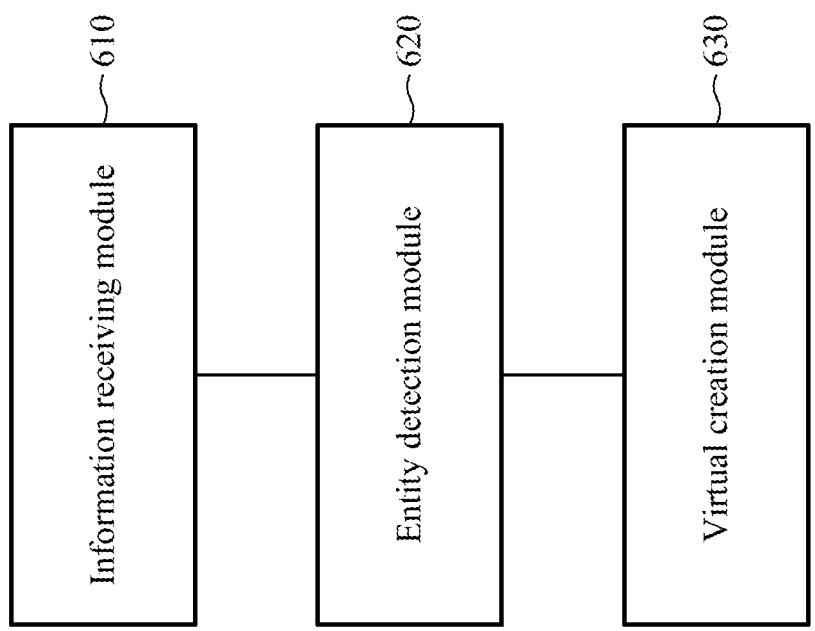
FIG. 6 is a frame diagram showing a device for creating credit card account according to another example of present disclosure.

Referring to FIG. 6 that is a frame diagram showing a device for creating credit card account according to another example of present disclosure. The device for creating credit card account may become a part of or a whole of the first server by using of software, hardware or their combination. The device may include an information receiving module 610, an entity detection module 620 and a virtual creation module 630.

Concretely, the information receiving module 610 may be configured to receive user real-name information of a user who fails to open an electronic exchange account from a first server, with the user real-name information being sent by a terminal device and sent to the first server;

The entity detection module 620 may be configured to detect if there is an existing credit account that corresponds to the user real-name information; and The virtual creation module 630 may be configured to create a virtual credit card account for the user if the credit card account is detected out.

In conclusion, in the technical solution of the present disclosure, the second server receives the user real-name information of the user who fails to open the electronic exchange account forwarded by the first server, and then detects if there is an existing credit account that corresponds to the user real-name information, and creates a virtual credit card account for the user if the credit card account is detected out.

By this way, the present disclosure solves the problems that it's time-consuming and inefficient for creating credit card account. Compared with the prior art, the method for creating credit card account of the present disclosure simplifies the process of acquiring a large quantity of user's information, and omits a manual verification for user's information, which simplifies the procedure for creating credit card account, thereby shortening the creation process and improving creation efficiency finally.

Figure 7:
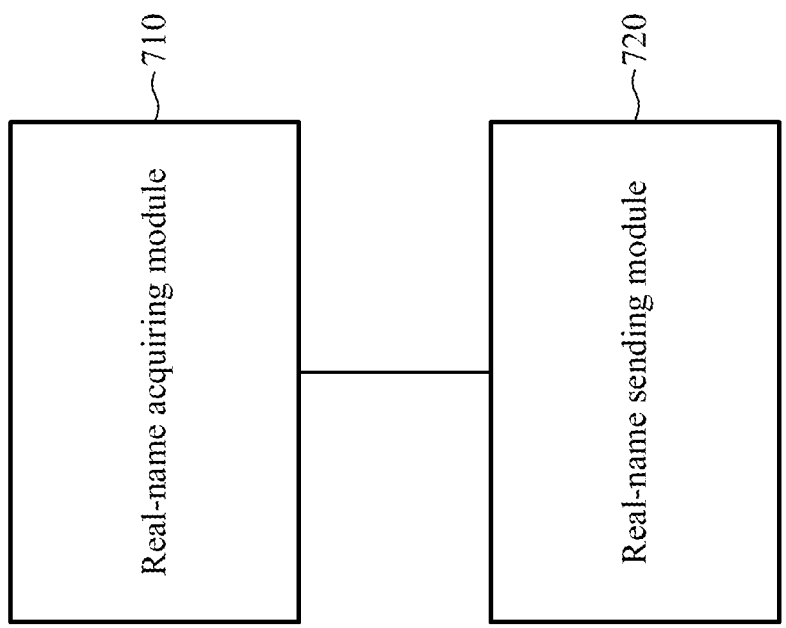
FIG. 7 is a frame diagram showing a device for creating credit card account according to another example of present disclosure.

Referring to FIG. 7 that is a frame diagram showing a device for creating credit card account according to another example of present disclosure. The device for creating credit card account may become a part of or a whole of the first server by using of software, hardware or their combination. The device may include a real-name acquiring module 710, and a real-name sending module 720.

Concretely, the real-name acquiring module 710 may be configured to acquire user real-name information of a user who fails to open an electronic exchange account.

The real-name sending module 720 may be configured to send the user real-name information to the first server, with the user real-name information being configured to trigger the second server to detect if there is an existing credit account that corresponds to the user real-name information after the user real-name information being sent from the first server to the second server, and create a virtual credit card account for the user if the credit card account is detected out.

In conclusion, in the technical solution of the present disclosure, the terminal device acquires the user real-name information of the user who fails to open the electronic exchange account, and forwards it from the first server, with the user real-name information being configured to trigger the second server detect if there is an existing credit account that corresponds to the user real-name information, and then create a virtual credit card account for the user if the credit card account is detected out.

By this way, the present disclosure solves the problems that it's time-consuming and inefficient for creating credit card account. Compared with the prior art, the method for creating credit card account of the present disclosure simplifies the process of acquiring a large quantity of user's information, and omits a manual verification for user's information, which simplifies the procedure for creating credit card account, thereby shortening the creation process and improving creation efficiency finally.

The present disclosure provides a device for creating a virtual credit card. The device may include: a first server having the data storage containing real-user information, wherein the first server may be configured to: receive user real-name information from a user interface of a terminal device; determine whether an electronic exchange account associated with the acquired user real-name information is stored in the data storage; send, if the electronic exchange account is not stored in the data storage, the user real-name information to a second server, for use by the second server for detecting if a credit card account associating with the user real-name information is saved in the second server, receive a virtual credit card account created by the second server; and store the virtual credit card associated with the virtual credit card account in the data storage.

The first server of the device may store the virtual credit card after the second server creates the virtual card account. The virtual credit card may be tied with the electronic account and/or the exchange resource account stored in the data storage of the first server. The first server may provide the cardholder means to access the card, such as an additional user interface to access the card via a terminal device. The access to the virtual credit card may be provided to the cardholder after the verification of the cardholder is passed. Any verification means, either currently known or later developed, may be used for such verification purpose. By this way, the user does not need to have a physical credit card.

In case the virtual credit card tied with the electronic exchange account, the first server may store or obtain the historical data and used the historical data to verify the cardholder for the virtual credit card. In addition, the first server may detect the verification is passed when the cardholder's own phone provides built-in methods for the verification, such as fingerprint verification.

As such, the first server of the device may determine whether the access to the virtual credit card is authorized, by using at least one of following methods: 1, newly developed verification process such as asking the cardholder to input the passcode in a user interface; 2, existing verification from electronic exchange account and/or electronic resource account (history data may be used); or 3, the third party built-in verification, for example, built-in mobile phone access verification.

After the verification is passed, an indicator may be saved in the first server and the cardholder may use the virtual credit card to make payments.

The first server of the device may be further configured to: acquire user history data stored in the data storage according to the user real-name information, and send the user history data to the second server, wherein the user real-name information and the user history data are used by the second server for creating the virtual credit card account.

The first server of the device may be further configured to: validate the terminal device by the first server, wherein the first server may be configured to: receive, from the second server, a validation terminal identity bound with the credit account stored in the second server; send validation information to a second user interface according to the received validation terminal identity; in response to send the validation information, receive second validation information from the terminal device; determine whether the second validation information matches the validation information; and validate the terminal device by saving an indicator in the data storage to indicate the terminal device is validated if the second validation information matches the validation information.

The first server of the device may be further configured to: validate the terminal device by using at least one of: SMS validation, instant messaging validation, voice validation, and email validation.

The first server of the device may be further configured to: create the electronic exchange account according to the received user real-name information by the first server, and saving the electronic exchange account to the data storage of the first server.

The first server of the device may be further configured to: receive, from the second server, account information of the virtual credit card account; bind the virtual credit card account with the electronic exchange account; and display a binding result in the user interface of the terminal device.

The first server of the device may be further configured to: send an exchange key acquiring instruction to the user interface of the terminal device; according to the exchange key acquiring instruction, acquire an electronic exchange key; and create the electronic exchange account according to the electronic exchange key and the real-name user account.

Figure 8:
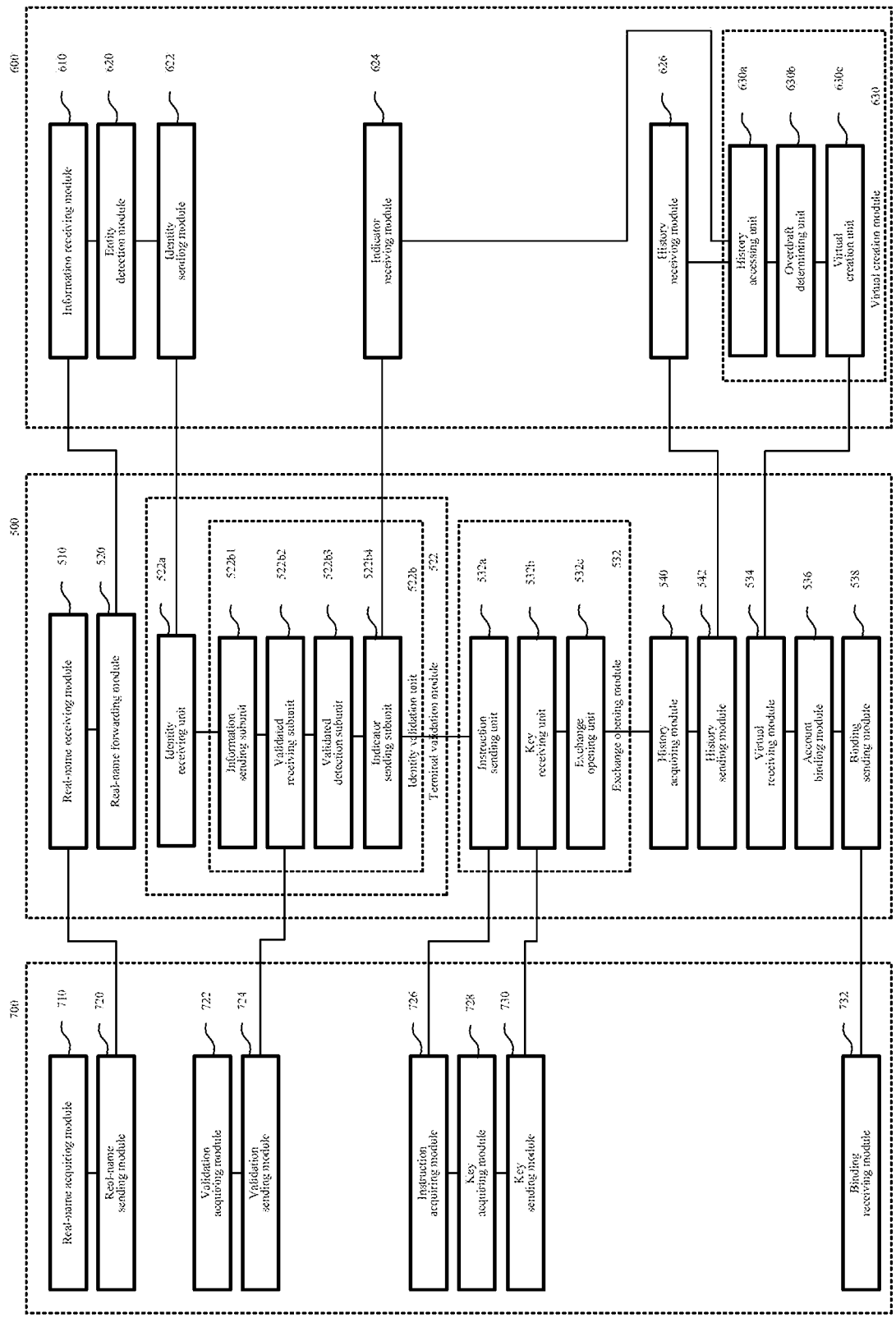
FIG. 8 is a frame diagram showing a system for creating credit card account according to an example of present disclosure.

FIG. 8 shows a system for creating credit card account according to the example of present disclosure. The system may include a terminal device 700, a first server 500 communicating to the terminal device 700 via wired or wireless network, and a second server 600 communicating to the first server 500 via wired or wireless network.

The terminal device 700 may include a device for creating credit card account which may become a part of or a whole of the first server 700 by using of software, hardware or their combination. The device includes a real-name acquiring module 710, a real-name sending module 720, a validation acquiring module 722, a validation sending module 724, an instruction acquiring module 726, a key acquiring module 728, a key sending module 730, and a binding receiving module 732.

Concretely, the real-name acquiring module 710 may be configured to acquire user real-name information of a user who fails to open an electronic exchange account.

The real-name sending module 720 may be configured to send the user real-name information to the first server, with the user real-name information being configured to trigger the second server to detect if there is an existing credit account that corresponds to the user real-name information after the user real-name information being sent from the first server to the second server, and create a virtual credit card account for the user if the credit card account is detected out.

The validation acquiring module 722 may be configured to acquire information to be validated which is entered after the first server receives a validation terminal identity which is bound with the credit card account and sent by the second server, and sends validation information to a validation terminal indicated by the validation terminal identity.

The validation sending module 724 may be configured to send the information to be validated to the first server, so that the first server detects if the information to be validated is the same with the validation information, and triggers the second server to create the virtual credit card account if the both are the same.

The instruction acquiring module 726 may be configured to receive an exchange key acquiring instruction sent by the first server.

The key acquiring module 728 may be configured to acquire an electronic exchange key according to the exchange key acquiring instruction;

The key sending module 730 may be configured to send the electronic exchange key to the first server, with the electronic exchange key being configured to trigger the first server to open an electronic exchange account for the user according to the electronic exchange key and the user real-name information, and bind the virtual credit card account with the electronic exchange account after receiving account information of the virtual credit card account sent by the second server, with the account information of the virtual credit card account being sent to the first server after the second server creating the virtual credit card account.

The binding receiving module 732 may be configured to receive a binding result sent by the first server.

The first server 500 may include a device for creating credit card account which may become a part of or a whole of the first server 500 by using of software, hardware or their combination. The device includes a real-name receiving module 510, a real-name forwarding module 520, a terminal validation module 522, an exchange opening module 532, a virtual receiving module 534, an account binding module 536, a binding sending module 538, a history acquiring module 540, and a history sending module 542.

Concretely, real-name receiving module 510 may be configured to receive user real-name information of a user who fails to open an electronic exchange account, with the user real-name information being sent by a terminal device.

The real-name forward module 520 may be configured to forward the user real-name information to a second server, with the user real-name information being configured to trigger the second server to detect if there is an existing credit account that corresponds to the user real-name information, and create a virtual credit card account for the user if the credit card account is detected out.

The terminal validation module 522 may be configured to validate terminal information of the user, and trigger the second server to create the virtual credit card account if the validation is passed.

Specifically, the terminal validation module 522 includes an identity receiving unit 522a and an identity validation unit 522b.

Concretely, the identity receiving unit 522a may be configured to receive a validation terminal identity bound with the credit card account sent by the second server, with the validation terminal identity being sent before the second server creating the virtual credit card account.

The identity validation unit 522b may be configured to validate the validation terminal identity.

Specifically, the identity validation unit 522b includes:

An information sending subunit 522b1, configured to send validation information to a validation terminal indicated by the validation terminal identity;

A validated receiving subunit 522b2, configured to receive information to be validated;

A validated detection subunit 522b3, configured to detect if the information to be validated is the same with the validation information; and An indicator sending subunit 522b4, configured to send an account creation indicator to the second server if the information to be validated is the same with the validation information, with the account creation indicator being configured to trigger the second server to create the virtual credit card account.

Concretely, the terminal validation module 522 may be configured to validate terminal information of the user, and trigger the second server to create the virtual credit card account if the validation is passed.

The exchange opening module 532 may be configured to open the electronic exchange account for the user according to the user real-name information.

Specifically, the exchange opening module 532 includes:

An instruction sending unit 532a, configured to send an exchange key acquiring instruction to the terminal device, with the exchange key acquiring instruction being configured to trigger the terminal device to obtain an electronic exchange key;

An key receiving unit 532b, configured to receive the electronic exchange key sent by the terminal device; and An exchange opening unit 532c, configured to open the electronic exchange account according to the electronic exchange key and the user real-name information.

Concretely, the virtual receiving module 534 may be configured to receive account information of the virtual credit card account send by the second server, with the account information being sent after the second server creating the virtual credit card account.

The account binding module 536 may be configured to bind the virtual credit card account with the electronic exchange account.

The binding sending module 538 may be configured to send a binding result to the terminal device.

The history acquiring module 540 may be configured to acquire user history data corresponding to the user real-name information.

The history sending module 542 may be configured to send the user history data to the second server, so that the second server creates the virtual credit card account according to the user history data.

The second server 600 may include a device for creating credit card account which may become a part of or a whole of the second server 600 by using of software, hardware or their combination. The device includes an information receiving module 610, an entity detection module 620, an identity sending module 622, an indicator receiving module 624, a history receiving module 626, and a virtual creation module 630.

Concretely, the information receiving module 610 may be configured to receive user real-name information of a user who fails to open an electronic exchange account for a first server, with the user real-name information being sent by a terminal device and sent to the first server.

The entity detection module 620 may be configured to detect if there is an existing credit account that corresponds to the user real-name information.

The identity sending module 622 may be configured to send a validation terminal identity bound with the credit card account to the first server.

The indicator receiving module 624 may be configured to receive an account creation indicator sent by the first server, with the account creation indicator being sent after the first server receiving the validation terminal identity and validating the validation terminal identity successfully.

The history receiving module 626 may be configured to receive user history data corresponding to the user real-name information.

The virtual creation module 630 may be configured to create a virtual credit card account for the user if the credit card account is detected out, and further configured to create the virtual credit card account according to the account creation indicator.

Concretely, the virtual creation module 630 includes:

A history accessing unit 630a, configured to access history social data, and/or history email data, and/or history financing data, and/or history login data in the user history data;

A credit limit determining unit 630b, configured to determine an credit limit of the virtual credit card account according to the history social data, and/or history email data, and/or history financing data, and/or history login data, with the credit limit being configured to identify the max spending amount for the virtual credit card account; and A virtual creation unit 630c, configured to create the virtual credit card account according to the credit limit.

In conclusion, in the technical solution of the present disclosure, the terminal device acquires the user real-name information of the user who fails to open the electronic exchange account, and forwards it from the first server to the second server; after receiving the user real-name information, the second server detects if there is an existing credit account that corresponds to the user real-name information, and creates a virtual credit card account for the user if the credit card account is detected out.

By this way, the present disclosure solves the problems that it's time-consuming and inefficient for creating credit card account. Compared with the prior art, the method for creating credit card account of the present disclosure simplifies the process of acquiring a large quantity of user's information, and omits a manual verification for user's information, which simplifies the procedure for creating credit card account, thereby shortening the creation process and improving creation efficiency finally.

In addition, the first server in the present example may acquire the user history data corresponding to the user real-name information, and then send it to the second server, so that, the user history data may be considered as a reference for determining the credit limit of the virtual credit card account in the second server. In such a way, the accuracy for setting the credit limit is ensured; meanwhile the creation of the virtual credit card account is quick and efficient. Furthermore, the first server in the examples opens electronic exchange account for the user which is bound with the virtual credit card account; as a result, electronic transactions may be conducted by the two accounts after the user gets the virtual credit card account, which improves the convenience of usage of the virtual credit card account.

It should be noted that, the device and system for creating credit card account mentioned above are divided into several functional modules. But in actual practice, the functions may be allocated to different functional modules to implement, that is, the structure of device may be divided into different functional modules, so as to implement a part of or a whole of functions mentioned above. In addition, the device and system for creating credit card account in the above examples have the same invention concept with that of the method examples, and the implementing process may be reviewed in the method examples, which is not repeated here.

Figure 9:
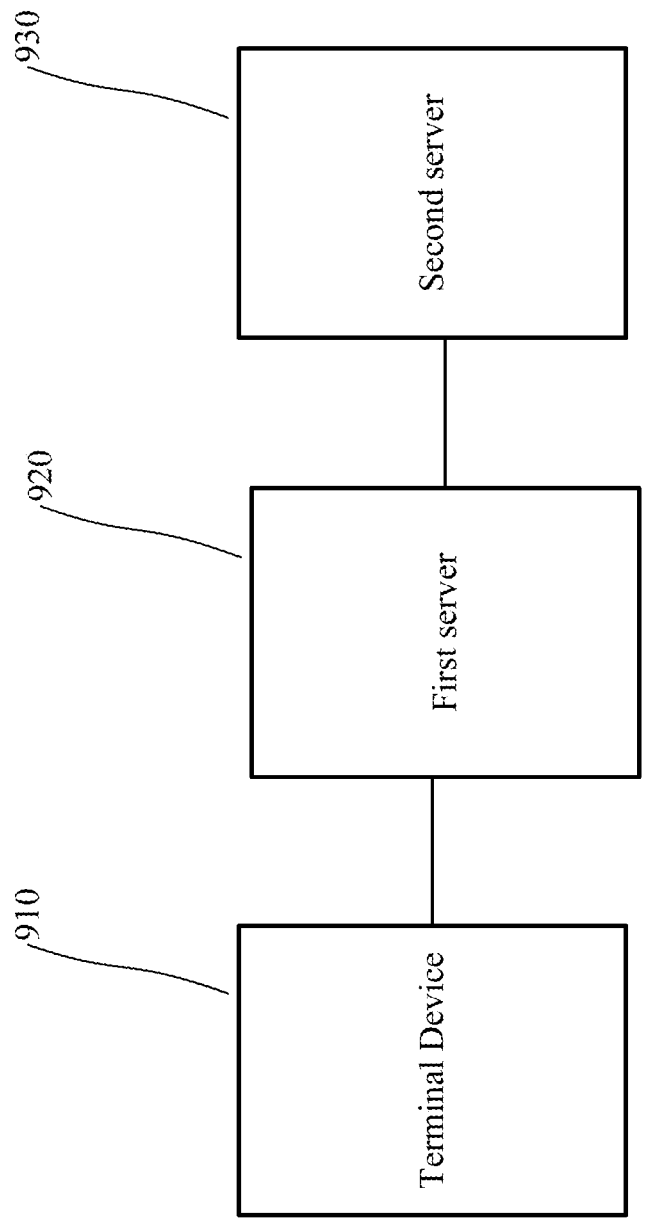
FIG. 9 is a frame diagram showing a system for creating credit card account according to another example of present disclosure.

FIG. 9 shows a system for creating credit card account according to another example of present disclosure. The system may include a terminal device 910, a first server 920 communicating to the terminal device 910 via wired or wireless network, and a second server 930 communicating to the first server 920 via wired or wireless network.

Concretely, the terminal device 910 may be configured to acquire user real-name information of a user who fails to open an electronic exchange account, and send it to the first server.

The first server 920 may be configured to receive the user real-name information and then forward it to the second server.

The second server 930 may be configured to receive the user real-name information and then detect if there is an existing credit account that corresponds to the user real-name information, and create a virtual credit card account for the user if the credit card account is detected out.

Optionally, the first server 920 is further configured to acquire user history data corresponding to the user real-name information, and then send it to the second server.

The second server 930 is further configured to receive the user history data and then create the virtual credit card account according to the user history data.

Optionally, the second server 930 is further configured to access history social data, and/or history email data, and/or history financing data, and/or history login data in the user history data, and/or an credit limit of the virtual credit card account determined according to the history social data, and/or history email data, and/or history financing data, and/or history login data, with the credit limit being configured to identify the max spending amount for the virtual credit card account.

Optionally, the first server 920 is further configured to validate terminal information of the user, and trigger the second server to create the virtual credit card account if the validation is passed.

Optionally, the second server 930 is further configured to send a validation terminal identity bound with the credit card account to the first server.

Accordingly, the first server 920 is further configured to receive the validation terminal identity and then validate it.

Optionally, the first server 920 is further configured to send validation information to a validation terminal indicated by the validation terminal identity, receive information to be validated sent by the terminal device, and detect if the information to be validated is the same with the validation information; and then validate the validation terminal identity successfully if the both are the same.

Optionally, the first server 920 is further configured to implement the validation for the terminal information of the user, by using one of mobile phone short message validation, instant messaging validation, voice validation, and email validation, or any combination thereof.

Optionally, the first server 920 is further configured to open the electronic exchange account for the user according to the user real-name information.

Optionally, the second server 930 is further configured to send account information of the virtual credit card account to the first server.

The first server 920 is further configured to receive the account information of the virtual credit card account, bind the virtual credit card account with the electronic exchange account, and send a binding result to the terminal device.

Optionally, the first server 920 is further configured to send an exchange key acquiring instruction to the terminal device.

Accordingly, the terminal device 910 is further configured to receive the exchange key acquiring instruction, and acquire an exchange key accordingly, and then send it to the first server.

Further, the first server 920 may be configured to receive the exchange key, and then open the electronic exchange account according to the exchange key and the user real-name information.

In conclusion, in the technical solution of the present disclosure, the terminal device acquires the user real-name information of the user who fails to open the electronic exchange account, and forwards it from the first server to the second server; after receiving the user real-name information, the second server detects if there is an existing credit account that corresponds to the user real-name information, and creates a virtual credit card account for the user if the credit card account is detected out.

By this way, the present disclosure solves the problems that it's time-consuming and inefficient for creating credit card account. Compared with the prior art, the method for creating credit card account of the present disclosure simplifies the process of acquiring a large quantity of user's information, and omits a manual verification for user's information, which simplifies the procedure for creating credit card account, thereby shortening the creation process and improving creation efficiency finally.

In addition, the first server in the present example may acquire the user history data corresponding to the user real-name information, and then send it to the second server, so that, the user history data may be considered as a reference for determining the credit limit of the virtual credit card account in the second server. In such a way, the accuracy for setting the credit limit is ensured; meanwhile the creation of the virtual credit card account is quick and efficient.

Furthermore, the first server in the examples opens electronic exchange account for the user which is bound with the virtual credit card account; as a result, electronic transactions may be conducted by the two accounts after the user gets the virtual credit card account, which improves the convenience of usage of the virtual credit card account.

The present disclosures provides a system for creating virtual credit to be stored in a data storage, comprising: a first server having the data storage, a terminal device having a user interface communicating to the first server, and a second server communicating to the first server; wherein:

The terminal device is configured to: acquire user real-name information from a user interface by a terminal device, wherein an electronic exchange account associating with the acquired user real-name information is not save in the first server;

The first server is configured to: receive the user real-name information, and send the user real-name information to the second server;

The second server is configured to: receive the user real-name information, detect if a credit account associating with the user real-name information is saved in the second server, and create a virtual credit card account if the credit account is saved in the second server; and The first server is configured to: store the virtual credit card associated with the virtual credit card account in the data storage of the first server.

The virtual credit card may be stored in the first server after the second server creates the virtual card account. The virtual credit card may be tied with the electronic account and/or the exchange resource account stored in the data storage of the first server. The first server may provide the cardholder means to access the card, such as an additional user interface to access the card via a terminal device. The access to the virtual credit card may be provided to the cardholder after the verification of the cardholder is passed. Any verification means, either currently known or later developed, may be used by the first server for such verification purpose. By this way, the user does not need to have a physical credit card.

In case the virtual credit card tied with the electronic exchange account stored in the data storage of the first server, the historical data stored or obtained by the first server may be used to verify the cardholder for the virtual credit card. In addition, the terminal device may be the cardholder's own mobile phone, the terminal device may provide built-in feature for the verification, such as fingerprint verification.

As such, the first server may determine whether the access to the virtual credit card is authorized, by using at least one of following methods: 1, newly developed verification process such as asking the cardholder to input the passcode in a user interface; 2, existing verification from electronic exchange account and/or electronic resource account (history data may be used); or 3, the third party built-in verification, for example, built-in mobile phone access verification.

After the verification is passed, an indicator may be saved in the first server and the cardholder may use the virtual credit card to make payments.

The first server of the system may be further configured to: acquire user history data stored in the data storage according to the user real-name information, and send the user history data to the second server; and the second server of the system may be further configured to: receive the user history data, and create the virtual credit card account by using the user history data.

The second server of the system may be further configured to: analyze the user history data by accessing at least one of: user payment data, user social data, historical email data, historical financing data and historical login data that are included in the user history data received by the second server; and determine a credit limit of the virtual credit card account according to the analyzed user history data.

The second server of the system may be further configured to: send a validation terminal identity bound with the credit account to the first server; and the first server of the system may be further configured to: receive, from the second server, the validation terminal identity; send validation information to a second user interface according to the received validation terminal identity; in response to send the validation information, receive second validation information from the terminal device; determine whether the second validation information matches the validation information; and validate the terminal device by saving an indicator in the data storage to indicate the terminal device is validated if the second validation information matches the validation information.

The first server of the system may be further configured to: validate the terminal device by using at least one of: SMS validation, instant messaging validation, voice validation, and email validation.

The first server of the system may be further configured to: create the electronic exchange account according to the received user real-name information, and save the electronic exchange account to the data storage.

The second server of the system may be further configured to: send account information of the virtual credit card account to the first server; and the first server of the system may be further configured to: receive the account information; bind the virtual credit card account with the electronic exchange account; and the terminal device may be further configured to: receive a binding result from the first server, and display the binding result in the user interface of the terminal device.

The first server of the system may be further configured to: send an exchange key acquiring instruction to the user interface of the terminal device; the terminal device may be further configured to: according to the exchange key acquiring instruction, acquire an electronic exchange key, and send the electronic exchange key to the first server; and the first server may be further configured to: receive the electronic exchange key, and create the electronic exchange account according to the electronic exchange key and the real-name user account.

Figure 10:
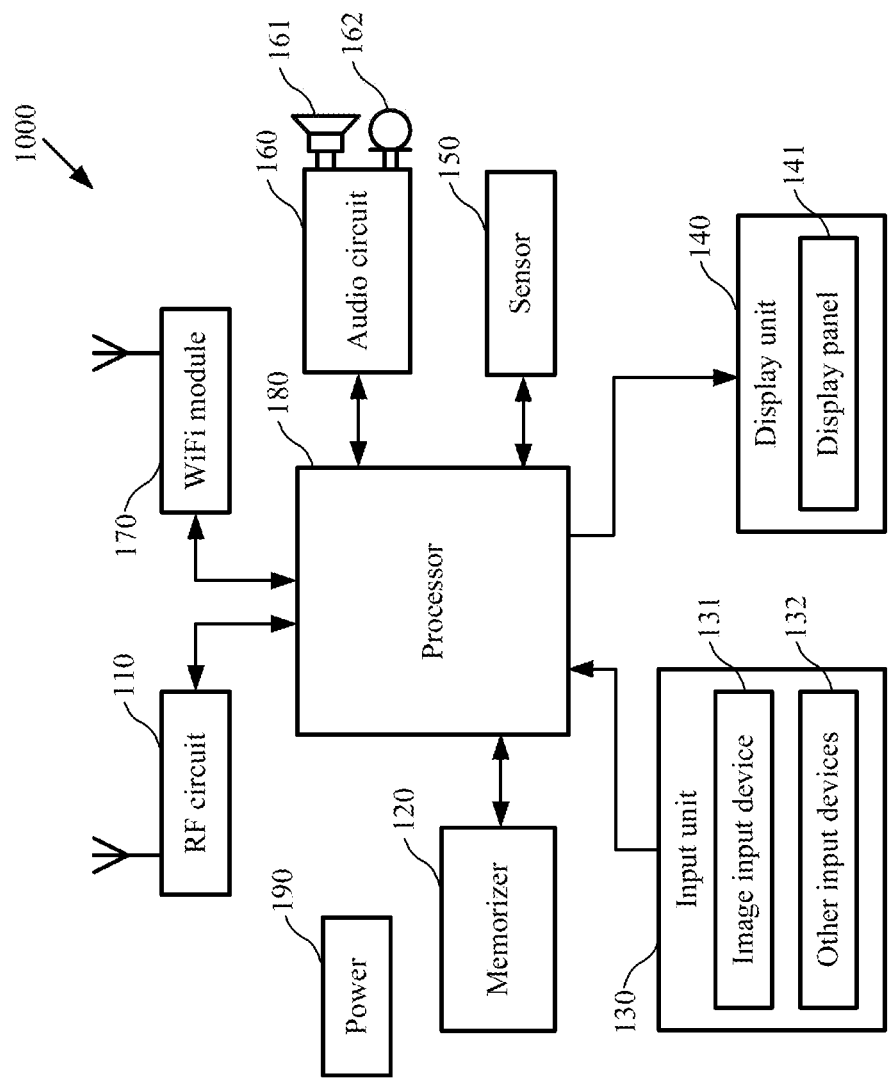
FIG. 10 is a frame diagram showing a terminal according to the example of present disclosure.

Referring to FIG. 10, a block diagram of a terminal provided in this example is shown. The terminal is used for performing the method for creating credit card account in the terminal device side.

Concretely, the terminal includes a radio frequency (RF) circuit 110, a memorizer 120 including one or more computer-readable storage mediums, an input unit 130, a display unit 140, a sensor 150, an audio circuit 160, a wireless fidelity (WiFi) module 170, a processor 180 including one or more cores, and a power 190, etc. It's understood that, the structure of the terminal shown in FIG. 10 is not limited; it can includes less or more components, or includes other combinations or arrangements.

Specifically, the RF circuit 110 may be used for receiving and sending signals during calling or process of receiving and sending message. Specially, the RF circuit 110 will receive downlink information from the base station and send it to the processor 180; or send uplink data to the base station. Generally, the RF circuit 110 includes, but is not limited to, an antenna, at least one amplifier, a transceiver, a coupler, a low noise amplifier (LNA), a diplexer, and the like. In addition, the RF circuit 110 can communicate with network or other devices by wireless communication. Such wireless communication can use any one communication standard or protocol, which includes, but is not limited to, Global System of Mobile communication (GSM), (General Packet Radio Service, GPRS), (Code Division Multiple Access, CDMA), (Wideband Code Division Multiple Access, WCDMA), (Long Term Evolution, LTE), email, or (Short Messaging Service, SMS).

The memorizer 120 is arranged for storing software program and module which will be run by the processor 180, so as to perform multiple functional applications of the mobile phone and data processing. The memorizer 120 mainly includes storing program area and storing data area. Concretely, the storing program area can store the operating system, at least one application program with required function (such as sound playing function, image playing function, etc.). The storing data area can store data established by mobile phone according to actual using demand (such as audio data, phonebook, etc.) Furthermore, the memorizer 120 may be high-speed random access memory, or nonvolatile memory, such as disk storage, flash memory device, or other volatile solid-state memory devices. Accordingly, the memorizer 120 may include a storing controller to help the processor 180 and the input unit 130 to access the memorizer 120.

The input unit 130 is arranged for receiving the entered number or character information, and the entered key signal related to user setting and function control. Concretely, the input unit 130 includes an image input device 131 or other input devices 132. The image input device 131 may be a camera, or photoelectric scanning device. The other input devices 132 can include, but is not limited to one or more selected from physical keyboard, function keys (such as volume control keys, switch key-press, etc.), a trackball, a mouse, and an operating lever, etc.

The display unit 140 is arranged for displaying information entered by the user or information supplied to the user, and menus of the mobile phone. For example, the display unit 140 includes a display panel 141, such as a Liquid Crystal Display (LCD), or an Organic Light-Emitting Diode (OLED).

Furthermore, the terminal may include at least one sensor 150, such as light sensors, motion sensors, or other sensors. Specifically, the light sensors includes ambient light sensors for adjusting brightness of the display panel 141 according to the ambient light, and proximity sensors for turning off the display panel 141 and/or maintaining backlight when the terminal is moved to the ear side.

Accelerometer sensor as one of the motion sensors can detect the magnitude of accelerations in every direction (Triaxial, generally), and detect the magnitude and direction of gravity in an immobile status, which is applicable to applications of identifying attitudes of the mobile (such as switching between horizontal and vertical screens, related games, magnetometer attitude calibration, etc.), vibration recognition related functions (such as pedometer, percussion, etc.). And the terminal 1000 also can configure other sensors (such as gyroscopes, barometers, hygrometers, thermometers, infrared sensors, etc.) whose detailed descriptions are omitted here.

The audio circuit 160, the speaker 161 and the microphone 162 supply an audio interface between the user and the terminal. Specifically, the audio data is received and converted to electrical signals by audio circuit 160, and then transmitted to the speaker 161, which are converted to sound signal to output. On the other hand, the sound signal collected by the speaker is then converted to electrical signals which will be received and converted to audio data.

Subsequently, the audio data are output to the processor 180 to process, and then sent to another mobile phone via the RF circuit 110, or sent to the memorizer 120 to process further. The audio circuit 160 may further include an earplug jack to provide a communication between the external earphone and the terminal 1000.

WiFi pertains to short-range wireless transmission technology providing a wireless broadband Internet, by which the mobile phone can help the user to receive and send email, browse web, and access streaming media, etc. Although the WiFi module 170 is illustrated in FIG. 10, it should be understood that, WiFi module 170 is not a necessary for the terminal, which may be omitted according the actual demand without changing the essence of the present disclosure.

The processor 180 is a control center of the mobile phone, which connects with every part of the mobile phone by various interfaces or circuits, and performs various functions and processes data by running or performing software program/module stored in the memorizer 120 or calling data stored in the memorizer 120, so as to monitor the mobile phone. Optionally, the processor 180 may includes one or more processing units. Preferably, the processor 180 can integrate with application processors and modem processors, for example, the application processors include processing operating system, user interface and applications, etc.; the modern processors are used for performing wireless communication. It may be understood that, it's an option to integrate the modern processors to the processor 180.

Furthermore, the terminal 1000 may include a power supply 190 (such as battery) supplying power for each component, preferably, the power supply can connect with the processor 180 by power management system, so as to manage charging, discharging and power consuming. The power supply 190 may include one or more AC or DC powers, recharging systems, power failure detection circuits, power converters or inverters, or power status indicators, etc.

In addition, the terminal may include a Bluetooth module, etc., which is not illustrated.

In the present examples, the terminal 1000 may include storage, and one or more programs stored in the storage, which are carried out by one or more processors. These programs include the following instructions:

Acquiring user real-name information of a user who fails to open an electronic exchange account; and Sending the user real-name information to a first server, with the user real-name information being configured to trigger a second server to detect if there is an existing credit account that corresponds to the user real-name information after it being forwarded to the second server, and create a credit card account for the user if the credit card account is detected out.

Assuming this is the basic example, a second example of the terminal based on the basic example may be modified to carry out the following instruction:

Acquiring information to be validated which is entered after the first server receiving a validation terminal identity which is bound with the credit card account and sent by the second server, and sending validation information to a validation terminal indicated by the validation terminal identity; and Sending the information to be validated to the first server, so that the first server detects if the information to be validated is the same with the validation information, and triggers the second server to create the virtual credit card account if the both are the same.

Based on the first and the second examples, a third example of the terminal may include the following instructions:

Receiving an exchange key acquiring instruction sent by the first server;

Acquiring an electronic exchange key according to the exchange key acquiring instruction;

Sending the electronic exchange key to the first server, with the electronic exchange key being configured to trigger the first server to open an electronic exchange account for the user according to the electronic exchange key and the user real-name information, and bind the virtual credit card account with the electronic exchange account after receiving account information of the virtual credit card account sent by the second server, with the account information of the virtual credit card account being sent to the first server after the second server creating the virtual credit card account; and Receiving a binding result sent by the first server.

Figure 11:
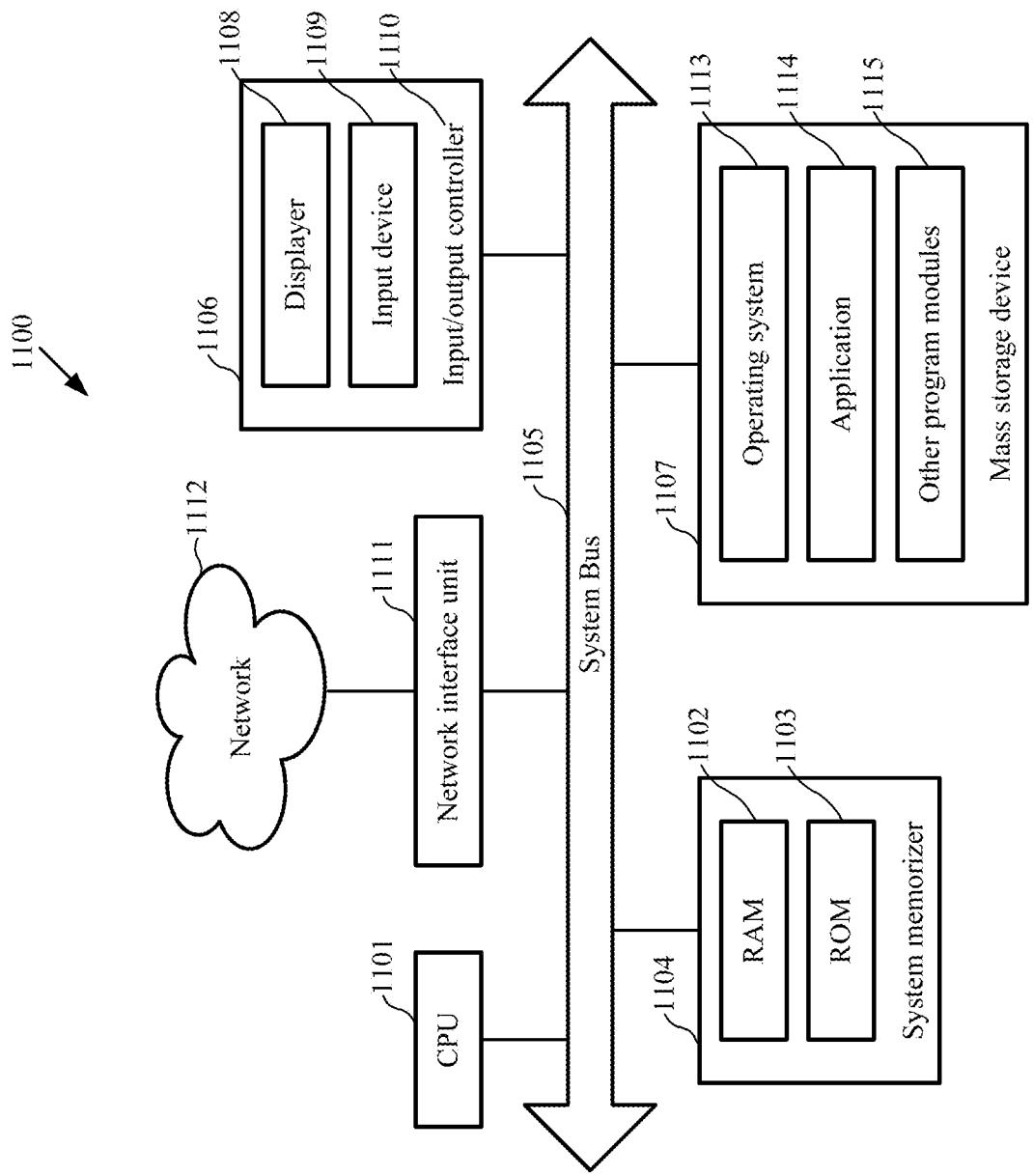
FIG. 11 is a frame diagram showing a server according to the example of present disclosure.

FIG. 11 shows a block diagram of a server provided in the present disclosure. The server may implement the method for creating credit card account on the first server side, or on the second server side. The server 1100 includes a CPU 1101, a system memorizer 1104 including a RAM 1102 and a ROM 1103, and a system bus 1105 connected with the system memorizer 1104 and the CPU 110. The server 1100 further includes a basic input/output system (I/O system) 1106 for transferring information among every component of the computer, and a mass storage device 1107 for storing operating system 1113, applications 1114 and other application modules 1115.

The basic I/O system 1106 includes a displayer 1108 for displaying and an input device 1109 for inputting information such as a mouse, a key. Concretely, the displayer 1108 and the input device 1109 are connected to the CPU 1101 via the input/output controller 1110 of the system bus 1105. The basic I/O system 1106 may further include the input/output controller 1110 for receiving and processing the input information from key, mouse, or electrical touchpen, and the like. Similarly, the input/output controller 1110 may include computer-readable medium such as hard disks or CD-ROM.

Commonly, the computer-readable medium may include computer storage medium and communication medium. The computer storage medium includes volatile medium, non-volatile medium, movable medium or immovable medium for storing readable instructions, data structure, program module or other data. The computer storage medium includes solid state memory such as RAM, ROM, EPROM, EEPROM, or flash memory, CD-ROM, DVD or other optical memory, magnetic tape, disk storage, and the like. The computer storage medium is not limited to them. The system storage 1104 and mass storage device 1107 may be called as storage.

According to examples of the present disclosure, the server 1100 may run in a remote computer on the network via Internet connection. That is, the server 1100 may connect to the network 1112 via a network interface unit 1111 of the system bus 1105, or connect to other networks or remote computer system (not shown) via the network interface unit 1111.

When the server 1100 is served as the first server, the first server may further include storages, and one or more programs stored in the storages, which are carried out by one or more CPUs 1101. These programs include the following instructions:

Receiving user real-name information of a user who fails to open an electronic exchange account, with the user real-name information being sent by a terminal device; and Forwarding the user real-name information to a second server, with the user real-name information being configured to trigger the second server to detect if there is an existing credit account that corresponds to the user real-name information, and create a virtual credit card account for the user if the credit card account is detected out.

Assuming this is the basic example, a second example of the terminal based on the basic example may be modified to carry out the following instruction:

Acquiring user history data corresponding to the user real-name information; and Sending the user history data to the second server, so that the second server create the virtual credit card account according to the user history data.

Based on the first example, a third example of the first server may carry out the following instructions:

Validating terminal information of the user, and trigger the second server to create the virtual credit card account if the validation is passed.

Based on the third example, a fourth example of the first server may carry out the following instructions:

Receiving a validation terminal identity which is bound with the credit card account and sent by the second server, with the validation terminal identity being sent before the second server creating the virtual credit card account; and Validating the validation terminal identity.

Based on the fourth example, a fifth example of the first server may carry out the following instructions:

Sending validation information to a validation terminal indicated by the validation terminal identity;

Receiving information to be validated sent by the terminal device;

Detecting if the information to be validated is the same with the validation information; and Sending an account creation indicator to the second server if the both are the same, with the account creation indicator being configured to trigger the second server to create the virtual credit card account.

Based on the third example, a sixth example of the first server may carry out the following instructions:

Implementing the validation for the terminal information, by using one of mobile phone short message validation, instant messaging validation, voice validation, and email validation, or any combination thereof.

Based on any one of the first example to sixth example, a seventh example of the first server may carry out the following instructions:

Opening an electronic exchange account for the user according to the user real-name information.

Based on the seventh example, an eighth example of the first server may carry out the following instructions:

Receiving the account information of the virtual credit card account sent by the second server, with the account information being sent after the second server creating the virtual credit card account;

Binding the virtual credit card account with the electronic exchange account; and Sending a binding result to the terminal device.

Based on the eighth example, a ninth example of the first server may carry out the following instructions:

Sending an exchange key acquiring instruction to the terminal device, with the exchange key acquiring instruction being configured to trigger the terminal device to acquire an electronic exchange key;

Receiving the electronic exchange key sent by the terminal device; and

Opening the electronic exchange account according to the electronic exchange key and the real-name user account.

When the server 1100 is served as the second server, the second server may further include storages, and one or more programs stored in the storages, which are carried out by one or more CPUs 1101. These programs include the following instructions:

Receiving user real-name information of a user who fails to open an electronic exchange account, with the user real-name information being forwarded by a first server and acquired by a terminal device and then sent to the second server; and Detecting if there is an existing credit account that corresponds to the user real-name information; and Creating a virtual credit card account for the user if the credit card account is detected out.

Assuming this is the basic example, a second example of the terminal based on the basic example may be modified to carry out the following instruction:

Receiving user history data corresponding to the user real-name information sent by the first server, with the user history data being configured to create the virtual credit card account.

Based on the second example, a third example of the second server may carry out the following instructions:

Creating the virtual credit card account according to the user history data.

Based on the third example, a fourth example of the second server may carry out the following instructions:

Accessing history social data, and/or history email data, and/or history financing data, and/or history login data in the user history data;

Determining an credit limit of the virtual credit card account according to the history social data, and/or history email data, and/or history financing data, and/or history login data, with the credit limit being configured to identify the max spending amount for the virtual credit card account; and Creating the virtual credit card account according to the credit limit.

Based on any one of the first example to the fourth example, a fifth example of the second server may carry out the following instructions:

Sending a validation terminal identity that is bound with the credit card account to the first server;

Receiving an account creation indicator sent by the first server, with the account creation indicator being sent after the first server receiving the validation terminal identity and successfully validating it; and Creating the virtual credit card account according to the account creation indicator.

It should be understood that, except for some instances which are described definitely, singular forms of "a", "an", "the" in the present disclosure aim at including plural forms. And it's understood that, "and/or" used in the present disclosure means any or all combination of one or more terms listed correlatively.

Order of examples is just used for description, which is not for showing the pros and cons.

It's understood for person skilled in the art to accomplish part of or whole steps in the example mentioned above by instructing the related hardware with program. Such program may be stored in a computer-readable storage medium such as read-only memory, random access memory, magnetic or optical disk, etc.

While the invention has been described in connection with what are presently considered to be the most practical and preferred examples, it is to be understood that the invention is not to be limited to the disclosed examples, but on the contrary, is intended to cover various modifications and equivalent arrangements included within the spirit and scope of the invention.

The invention claimed is:

1. A social network application and exchange server for providing social network accounts to users comprising a data storage containing real-name user information, a memory containing instructions, and a processor, wherein the processer, when executing the instructions, is configured to cause the social network application and exchange server to create an exchange account bound to a social network account of a user in the social network application server and a virtual credit card bound to the exchange account by causing the social network application server to:
 receive, via the social network account of the user, user real-name ID information of the user from a user interface of a social network application corresponding to the social network application and exchange server and running on a client terminal device;
 send the user real-name ID information to a second server, for use by the second server for detecting if a credit card account associating with the user real-name ID information was previously issued and is saved in the second server;
 receive an identity of a validation terminal device sent from the second server in response to determining that a credit card account associated with the user real-name ID information was previously issued, wherein the validation terminal device is different from the client terminal device;
 perform validation by sending a validation code to the validation terminal device according to the received identity of the validation terminal device, receiving a second code entered by a user into the client terminal device wherein the second code is determined by the user by obtaining the validation code from the validation terminal device, and determining that the validation is successful when the validation code matches the second code; and
 upon determining that the validation is successful:
  send an indicator of successful validation to the second server to prompt the second server to create a virtual credit card account separate from and independent of the credit card account previously issued;
  send user historical social data of the user including at least one of historical online time, historical social network chatting time, historical email data, and historical social network login data to the second server for the second server to generate a credit limit for the virtual credit card account;
  receive the virtual credit card account and the credit limit;
  open a new electronic exchange account associated with the received user real-name ID information, wherein the new electronic exchange account has a binding relationship with the social network account;
  create a binding relationship between the virtual credit card account and the new electronic exchange account; and
  conduct a transaction using the virtual credit card account via the binding relationship on behalf of the new electronic exchange account from the user interface provided by the social network application.

2. The social network application server of claim 1, wherein the validation code is sent to the validation terminal device via at least one of: SMS, instant messaging, voice, and email.

3. The social network application and exchange server of claim 1, wherein the social network application server is configured to open the new electronic exchange account by:
 sending an exchange key acquiring instruction to the user interface of the client terminal device;
 according to the exchange key acquiring instruction, acquiring an electronic exchange key; and
 creating the new electronic exchange account according to the electronic exchange key and the user real-name ID information.

4. A system for creating an exchange account bond to a social network account of a user in a social network application and exchange server and a virtual credit card bound to the exchange account to be stored in a data storage of the social network application and exchange server, comprising: the social network application and exchange server having the data storage, a client terminal device having a user interface communicating with the social network application and exchange server, and a second server communicating with the social network application and exchange server,
 wherein the client terminal device is configured to:
  run a social network application to access the social network application and exchange server via the social network account of the user corresponding to user real-name ID information; and
  acquire the user real-name ID information from the user interface of the social network application and send the user real-name ID information to the social network application and exchange server;
 wherein the social network application server is configured to:
  receive the user real-name ID information from the client terminal device;
  send the user real-name ID information to the second server, for use by the second server for detecting if a credit card account associated with the user real-name ID information was previously issued and is saved in the second server;
  receive an identity of a validation terminal device sent from the second server in response to determining that a credit card account associated with the user real-name ID information was previously issued, wherein the validation terminal device is different from the client terminal device;
  perform validation by sending a validation code to the validation terminal device according to the received identity of the validation terminal device, receiving a second code entered by the user into the client terminal device wherein the second code is determined by the user by obtaining the validation code from the validation terminal device, and determining that the validation is successful when the validation code matches the second code; and
  upon determining that the validation is successful:
   send an indicator of successful validation to the second server to prompt the second server to create a virtual credit card account separate from and independent of the credit card account previously issued;
   send user historical social data of the user including at least one of historical online time, historical social network chatting time, historical email data, and historical social network login data to the second server for the second server to generate a credit limit for the virtual credit card account;

receive the virtual credit card account and the credit limit;

open a new electronic exchange account associated with the received user real-name ID information, wherein the new electronic exchange account has a binding relationship with the social network account;

create a binding relationship between the virtual credit card account and the new electronic exchange account; and conduct a transaction using the virtual credit card account via the binding relationship on behalf of the new electronic exchange account from the user interface provided by the social network application; and wherein the second server is configured to:

receive the user real-name ID information from the social network application and exchange server;

send the identity of the validation terminal device to the social network application and exchange server;

receive the indicator of successful validation from the social network application and exchange; and creating the virtual credit card account.

5. The system of claim 4, wherein:
the client terminal device is further configured to receive a binding result from the social network application and exchange server, and display the binding result in the user interface of the client terminal device.

6. The system of claim 4, wherein:
the social network application and exchange server is further configured to:
send an exchange key acquiring instruction to the user interface of the client terminal device;
the client terminal device is further configured to:
according to the exchange key acquiring instruction, acquire an electronic exchange key, and send the electronic exchange key to the social network application and exchange server; and
the social network application and exchange server is further configured to:
receive the electronic exchange key, and create the new electronic exchange account according to the electronic exchange key and the user real-name ID information.

7. A method for creating an exchange account bond to a social network account of a user in a social network application and exchange server and a virtual credit card bound to the exchange account to be stored in a data storage of a social network application and exchange server, comprising:
receiving, by the social network application and exchange server, user real-name ID information of the user from a user interface of a social network application running on a client terminal device to access the social network application and exchange server via the social network account of the user;
sending, by the social network application and exchange server, the user real-name ID information to a second server, for use by the second server for detecting if a credit card account associating with the user real-name ID information was previously issued and is saved in the second server;
receiving, by the social network application and exchange server, an identity of a validation terminal device sent from the second server in response to determining that a credit card account associated with the user real-name ID information was previously issued;

performing, by the social network application and exchange server, validation by sending a validation code to the validation terminal device according to the received identity of the validation terminal device, receiving a second code entered by the user into the client terminal device wherein the second code is determined by the user by obtaining the validation code from the validation terminal device, and determining that the validation is successful when the validation code matches the second code, wherein the validation terminal device is different from the client terminal device; and upon determining that the validation is successful:
sending, by the social network application and exchange server, an indicator of successful validation to the second server to prompt the second server to create a virtual credit card account separate from and independent of the credit card account previously issued;
sending user historical social data of the user including at least one of historical online time, historical social network chatting time, historical email data, and historical social network login data to the second server for the second server to generate a credit limit for the virtual credit card account;
receiving, by the social network application and exchange server, the virtual credit card account and the credit limit;
opening an electronic exchange account associated with the received, by the social network application server, user real-name ID information, wherein the electronic exchange account has a binding relationship with the social network account;
creating, by the social network application and exchange server, a binding relationship between the virtual credit card account and the electronic exchange account; and
conducting, by the social network application and exchange server, a transaction using the virtual credit card account via the binding relationship on behalf of the electronic exchange account from the user interface provided by the social network application.

8. The method according to claim 7, wherein creating the virtual credit card account by using the user historical social data comprises:
analyzing, by the second server, the user historical social data; and
determining, by the second server, a credit limit of the virtual credit card account according to the analyzed user historical social data.

9. The method according to claim 7, wherein the validation code is sent to the validation terminal device via at least one of: SMS, instant messaging, voice, and email.

10. The method of to claim 7, wherein creating the electronic exchange account according to the user real-name ID information by the social network application and exchange server comprises:
sending an exchange key acquiring instruction to the user interface of the client terminal device;
according to the exchange key acquiring instruction, acquiring an electronic exchange key, and sending the electronic exchange key to the social network application and exchange server; and
receiving the electronic exchange key by the social network application and exchange server, and creating the electronic exchange account according to the electronic exchange key and the user real-name ID information.

\* \* \* \* \*